United States Patent
Sauermann

(10) Patent No.: US 7,647,592 B2
(45) Date of Patent: Jan. 12, 2010

(54) METHODS AND SYSTEMS FOR ASSIGNING OBJECTS TO PROCESSING UNITS

(75) Inventor: Volker Sauermann, Heidelberg (DE)

(73) Assignee: SAP AG, Walldorf (DE)

( * ) Notice: Subject to any disclaimer, the term of this patent is extended or adjusted under 35 U.S.C. 154(b) by 1179 days.

(21) Appl. No.: 10/964,607

(22) Filed: Oct. 15, 2004

(65) Prior Publication Data

US 2005/0125799 A1    Jun. 9, 2005

(30) Foreign Application Priority Data

Oct. 16, 2003    (EP)    ................... 03023374

(51) Int. Cl.
G06F 9/46    (2006.01)
G06F 15/173    (2006.01)
G06F 17/00    (2006.01)

(52) U.S. Cl. .................. 718/105; 718/102; 718/104; 709/226; 707/100

(58) Field of Classification Search ......... 718/102–105; 709/223, 226; 707/1–2, 10, 100, 200
See application file for complete search history.

(56) References Cited

U.S. PATENT DOCUMENTS

| | | | |
|---|---|---|---|
| 6,173,306 B1 * | 1/2001 | Raz et al. ................... | 718/102 |
| 2002/0046316 A1 | 4/2002 | Borowsky et al. | |
| 2003/0105903 A1 | 6/2003 | Garnett et al. | |
| 2004/0054780 A1 * | 3/2004 | Romero ..................... | 709/226 |
| 2005/0177833 A1 | 8/2005 | Sauermann | |

FOREIGN PATENT DOCUMENTS

| | | |
|---|---|---|
| EP | 1 524 599 | 2/2008 |
| EP | 1 564 638 | 2/2008 |

OTHER PUBLICATIONS

Leinberger et al., "Multi-Capacity Bin Packing Algorithms with Applications to Job Scheduling under Multiple Constraints" 1999, pp. 1-9.*
Chang et al., "Multi-Capacity Bin Packing Algorithms with Applications to Job Scheduling under Multiple Constraints", 1993, pp. 1-6.*
Csirik et al. "Online Algorithms: 1-24 the State of the Art", Springer Berlin, 1998, pp. 147-195.*
G. Aggarwal et al., The Load Rebalancing Problem; Proceedings of the Fifteenth Annual ACM Symposium on Parallel Algorithms and Architectures, Jun. 2003, pp. 258-265.

(Continued)

*Primary Examiner*—Hyung S Sough
*Assistant Examiner*—Qing-Yuan Wu
(74) *Attorney, Agent, or Firm*—Finnegan, Henderson, Farabow, Garrett & Dunner, LLP

(57) ABSTRACT

Methods and systems are provided for assigning objects to processing units. In one implementation, a method is provided for assigning objects to a cluster of processing units, wherein each of the processing units has a storage capacity. The method may include the steps of providing an ordered sequence of objects, providing an initial distribution of the objects to the processing units, and processing the objects in the order of the sequence to improve the smoothness of the initial distribution.

10 Claims, 27 Drawing Sheets

OTHER PUBLICATIONS

J. Verhoosel et al., Incorporating Temporal Considerations during Assignment and Pre-run-time Scheduling of Objects and Processes; Journal of Parallel and Distributed Computing, Jul. 10, 1996, pp. 13-31.

C. Fonlupt et al., Data-parallel load balancing strategies; Parallel Computing, Oct. 1, 1998, pp. 1665-1684.

E. J. Lu et al., An Efficient Load Balancing Technique for Parallel FMA in Message Passing Environment; Proceedings of the Eighth SIAM Conference on Parallel Processing for Scientific Computing, Mar. 1997, pp. 1-8.

E. G. Coffman et al., Approximation Algorithms for Bin Packing: A Survey; Approximation Algorithms for NP-Hard Problems, 1996, pp. 1-53.

Architectures and Infrastructure for Blade Computing, Sep. 2002, Sun Microsystems, pp. 1-14, www.sun.com/servers/entry/blade.

The Next Wave: Blade Server Computing, Sun Microsystems, pp. 1-17, www.sun.com/servers/entry/blade.

"Relational Assignments for Distributed Database Systems," IBM Technical Disclosure Bulletin, IBM Corp., New York, Jun. 1, 1998, pp. 219-225(6 pages).

European Search Report for Application No. 04 00 2903 dated Oct. 1, 2004 (11 pages).

Kunz, T., "The Influence of Different Workload Descriptions on a Heuristic Load Balancing Scheme," IEEE Transactions on Software Engineering, vol. 17, No. 7, Jul. 1991, pp. 725-730 (6 pages).

Leinberger, W. et al., "Multi-Capacity Bin Packing Algorithms with Applications to Job Scheduling Under Multiple Constraints," URL:http://www-users.cs.umn.edu/{karypis/publications/Papers/PDF/mribinpack.pdf>, Department of Computer Science and Engineering, May 27, 1999 (9 pages).

Maruyama, K. et al., "A General Packing Algorithm for Multidimensional Resource Requirements," International Journal of Computer and Information Sciences, vol. 6, No. 2, Jun. 1977, pp. 131-149 (19 pages).

"Relational Assignments for Distributed Database Systems," Jun. 1, 1998, IBM Technical Disclosure Bulletin, IBM Corp., pp. 219-225 (7 pages).

\* cited by examiner

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 12
Blade 2: Tables 15, 6, 2, 13, 14
Blade 3: Tables 1, 7
Blade 4: Tables 5, 19
Blade 5: Tables 4, 17
Blade 6: Tables 16, 9
Blade 7: Tables 10, 18, 3
Blade 8: Tables 8, 11

Blade 1: Tables 20, 12
Blade 2: Tables 15, 6, 2, 13, 14
Blade 3: Tables 1, 7
Blade 4: Tables 5, 19
Blade 5: Tables 4
Blade 6: Tables 16, 9
Blade 7: Tables 18, 3, 17
Blade 8: Tables 8, 11, 10

Blade 1: Tables 20, 12
Blade 2: Tables 15, 6, 2, 13, 14
Blade 3: Tables 1, 7
Blade 4: Tables 5, 19
Blade 5: Tables 4
Blade 6: Tables 16, 9
Blade 7: Tables 18, 3, 17
Blade 8: Tables 8, 11, 10

Blade 1: Tables 20, 12
Blade 2: Tables 15, 6, 2, 13, 14
Blade 3: Tables 1, 7
Blade 4: Tables 5, 19
Blade 5: Tables 4, 18
Blade 6: Tables 16, 9
Blade 7: Tables 3, 17, 8
Blade 8: Tables 11, 10

Blade 1: Tables 20, 12
Blade 2: Tables 15, 6, 2, 13, 14
Blade 3: Tables 1, 7
Blade 4: Tables 5
Blade 5: Tables 4, 18
Blade 6: Tables 16, 9
Blade 7: Tables 3, 17, 8
Blade 8: Tables 11, 10, 19

Blade 1: Tables 20, 12
Blade 2: Tables 15, 6, 2, 13, 14
Blade 3: Tables 1
Blade 4: Tables 5, 7
Blade 5: Tables 4, 18
Blade 6: Tables 16, 9
Blade 7: Tables 3, 17, 8
Blade 8: Tables 11, 10, 19

Blade 1: Tables 20
Blade 2: Tables 15, 6, 2, 13, 14
Blade 3: Tables 1, 12

Blade 4: Tables 5, 7
Blade 5: Tables 4, 18
Blade 6: Tables 16, 9

Blade 7: Tables 3, 17, 8
Blade 8: Tables 11, 10, 19

Blade 1: Tables 20, 6
Blade 2: Tables 15, 2, 13, 14
Blade 3: Tables 1, 12
Blade 4: Tables 5, 7
Blade 5: Tables 4, 18
Blade 6: Tables 16, 9
Blade 7: Tables 3, 17, 8
Blade 8: Tables 11, 10, 19

Blade 1: Tables 20, 6
Blade 2: Tables 15, 13, 14
Blade 3: Tables 1, 12
Blade 4: Tables 5, 7
Blade 5: Tables 4, 18, 2
Blade 6: Tables 16, 9
Blade 7: Tables 3, 17, 8
Blade 8: Tables 11, 10, 19

METHODS AND SYSTEMS FOR ASSIGNING OBJECTS TO PROCESSING UNITS

BACKGROUND

1. Technical Field

The present invention generally relates to the field of data processing. More particularly, and without limitation, embodiments of the invention relate to methods and systems for assigning objects to processing units, as well as methods and systems for object size balancing in multi-computing environments.

2. Background Information

Various multi-computing architectures are known in the art where a plurality of processing units are coupled to form a cluster. Such architectures are used in parallel processing and also in the emerging field of blade computing.

Blade computing relies on blade servers, which are modular, single-board computers. An overview of blade computing is given in, for example, "Architectures and Infrastructure for Blade Computing", September 2002, Sun Microsystems and "THE NEXT WAVE: BLADE SERVER COMPUTING", Sun Microsystems.

A content load balancing blade is commercially available from Sun Microsystems ("Sun Fire™ B10 n"). This blade provides traffic and content management functionalities. Content load balancing is achieved based on URLs, CGI scripts and cookies. Server load balancing is achieved based on server loads, response times, and weighted round-robin algorithms.

U.S. Pat. No. 7,032,037 shows a web edge server, which comprises a number of blade servers. A switch and an information distribution module are provided for the purpose of balancing. The information distribution module receives an information message, performs processing on the message to determine a destination, and forwards a message toward the determined destination via an internal communications network.

SUMMARY

Embodiments of the present invention are directed to methods and systems for assigning objects to processing units. The processing units may be arranged as a cluster of processing units. Further, each of the processing unit may have a certain or predetermined storage capacity. By way of example, the processing units may be similar or substantially identical and may have identical storage capacities, as in the case of blade computing.

In one embodiment, to perform the assignment of objects to processing units, an initial distribution of the objects to processing units may be provided. This can be any arbitrary assignment, such as a real live assignment in an existing data processing system, or a pre-calculated assignment with a minimum number of processing units. Further, an ordered sequence of the objects may be provided. On this basis, a redistribution of the objects may be performed in order to improve the smoothness of the initial distribution in one or more iterations.

The processing of the objects may be performed in the order of the sequence. In each iteration, a set of the processing units may be determined which may consist of processing units having aggregated sizes of assigned objects above a threshold level. The remaining processing units may constitute a second set of processing units, i.e. processing units having aggregated sizes of assigned objects below the threshold.

Next, a determination may be made as to whether the considered object of the ordered sequence fits on a processing unit of the second set. In other words, a determination may be made as to whether a processing unit of the second set has sufficient remaining storage capacity in order to accommodate the considered object. If such a processing unit of the second set can be identified, the considered object may be tentatively reassigned to the processing unit of the second set and a statistical measure is calculated for the resulting tentative distribution. In case the statistical measure for the tentative distribution indicates an improved smoothness of the tentative distribution in comparison to the distribution of the previous iteration, the considered object may be reassigned to the processing unit of the second set.

In accordance with another embodiment, the processing of the objects of the ordered sequence may stop when either the first or the second set is empty or the last element of the sequence has been processed. This way, the smoothness of the initial distribution of the objects to the processing unit can be substantially improved. This has the advantage that the loading of the individual processing units in terms of storage capacity can be about evenly distributed.

In accordance with an embodiment of the invention, the ordered sequence of objects may be provided by sorting of the objects by size. This ordered sequence can be used for both iteratively reassigning of objects in order to improve the smoothness of the distribution as well as for providing the initial distribution.

In accordance with a further embodiment of the invention, the initial distribution of objects to processing units is provided by a procedure that starts with the largest object in the sequence and continues until the remaining storage capacity of the processing unit considered is below the size of the smallest remaining object of the sequence. When this condition is fulfilled, the procedure is carried out again for the next processing unit, whereby the objects that have been previously assigned, are deleted from the sequence. This way, a minimum number or processing units that are required for handling a given set of objects can be determined.

In accordance with another embodiment of the invention, the remaining storage capacity of a processing unit may be determined by the difference between the storage capacity of the unit and the aggregated size of objects that have been assigned to the processing unit. On the basis of this definition of the remaining storage capacity, the minimum number of processing units is determined.

In accordance with a further embodiment of the invention, the theoretical storage capacity minimum per processing unit for a perfectly evenly distributed storage load may be used as a threshold for differentiating between processing units belonging to the first and the second set. This threshold is obtained by calculating the total of the sizes of the objects and dividing the total by the number of processing units.

In accordance with yet another embodiment of the invention, the statistical measure which is used to assess the quality of the distribution of objects to processing units is based on the aggregated sizes of objects assigned to processing units. In other words, the total of the object sizes assigned to each of the processing units is calculated. This provides one total size per processing unit. The total sizes form the basis for the calculation of the statistical measure. Preferably, the statistical measure is the standard deviation or variance of the total object sizes.

In accordance with still another embodiment of the invention, there can be more than one processing unit of the second set which has sufficient remaining storage capacity for accommodating the considered object. In this case, the considered object is tentatively assigned to each one of the processing units of the second set which provides a corresponding number of tentative distributions. Each one of the tentative distributions is evaluated by means of the statistical measure. On this basis, the tentative distribution having the highest quality as indicated by the statistical measure is selected and the object is reassigned correspondingly.

In accordance with another embodiment of the invention, each one of the processing units is a blade or a blade server. One of the blades can have a program that implements the principles of the present invention in order to perform object size balancing. This way the number of swap-operations between the blades can be minimised.

In accordance with one embodiment, methods and systems consistent with the invention may be implemented in an application program running on a personal computer. The application program may be provided with a list of objects and the estimated sizes of the objects that need to be handled by a cluster of processing units. On the basis of the object sizes, the minimum number of processing units that are required for the processing can be determined. Further, the initial distribution of objects to processing units can be improved by iteratively reassigning objects to processing units.

It is to be noted that embodiments of the present invention are not restricted to any particular type of object. For example, data objects such as tables, arrays, lists and trees are distributed to processing units, e.g. blades in accordance with the principles of the present invention. For example, each one of the processing units may run a data processing task to which its respective objects are assigned.

Additional objects and advantages of the invention will be set forth in part in the description which follows, and in part will be obvious from the description, or may be learned by practice of the disclosed embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to the present embodiments (exemplary embodiments) of the invention, an examples of which are illustrated in the accompanying drawings. Wherever possible, the same reference numbers will be used throughout the drawings to refer to the same or like parts.

Figure 1:
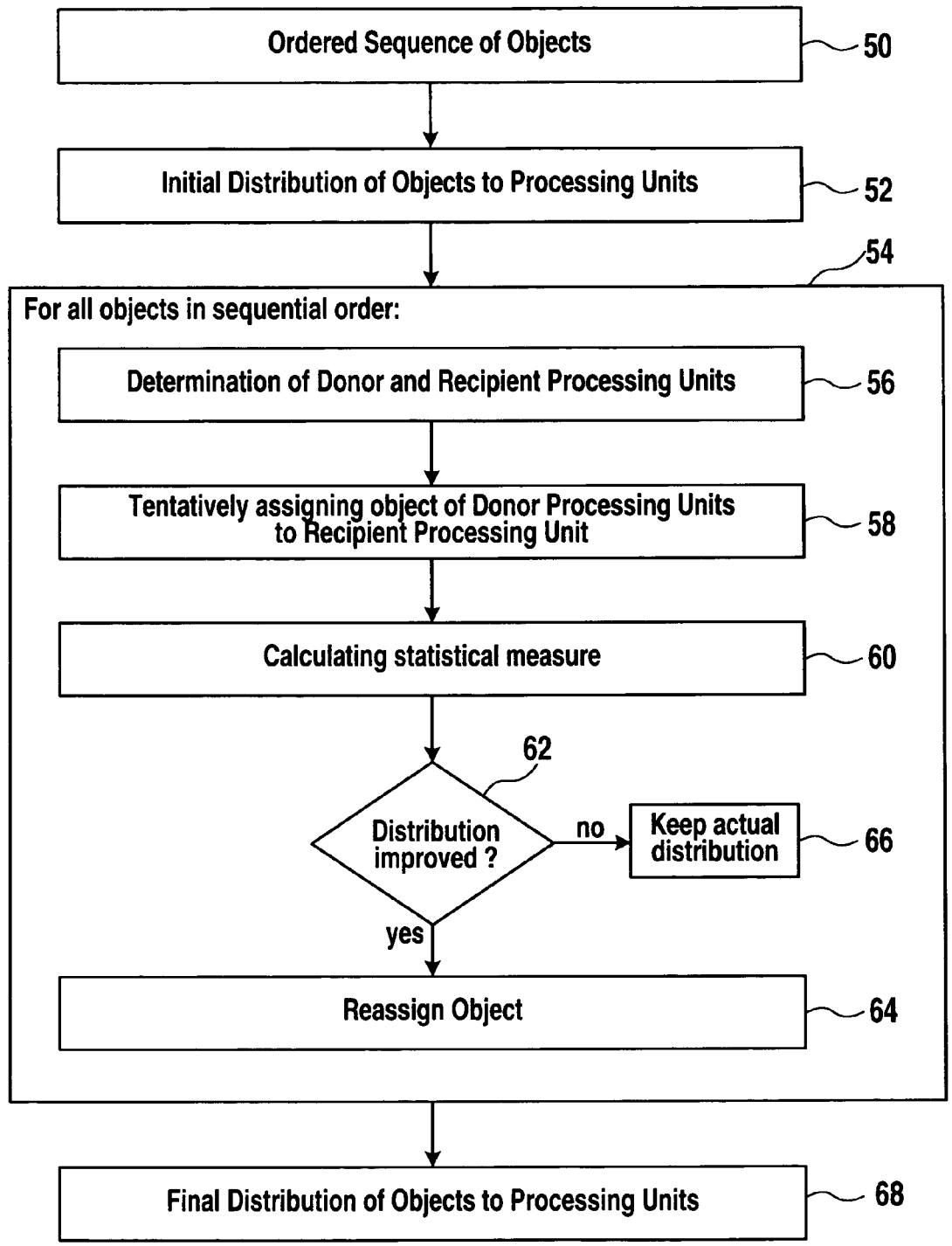
FIG. 1 illustrates a flow chart of an exemplary method, consistent with an embodiment of the invention.

FIG. 1 shows a flow diagram of an exemplary method for assigning objects, consistent with an embodiment of the invention. The exemplary method of FIG. 1 may be implemented to improve the smoothness of an initial distribution of objects to processing units, for example.

In step 50, an ordered sequence of objects is provided. In the example of FIG. 1, the first element of the ordered sequence may require the largest storage space. Consistent with an embodiment of the invention, the ordered sequence may be sorted in descending order of the object sizes. Following step 50, an initial distribution of objects to processing units is provided, at step 52.

Following steps 50 and 52, a loop 54 may be performed for all objects of the sequence in the order of the sequence. In step 56 of loop 54, a determination of donor and recipient processing units is made on the basis of the actual distribution of objects to processing units. In the first iteration when the first object in the ordered sequence is considered, the actual distribution is the initial distribution provided in step 52.

A donor processing unit may comprise a processing unit which belongs to the first set of processing units, i.e. which has an aggregated size of assigned objects above a threshold level. Those processing units which are not donor processing units are by definition recipient processing units, i.e. processing units belonging to the second set having aggregated object sizes below the threshold. The threshold which is used for differentiating between donor and recipient processing units may be based on the theoretical storage capacity minimum per processing unit that is obtained by calculating the total of the sizes of all objects to be assigned to processing units divided by the number of processing units.

In step 58 of loop 54, an object of a donor processing unit is tentatively assigned to a recipient processing unit that has sufficient remaining storage capacity for the considered object. In step 60, the statistical measure is calculated for the resulting tentative distribution of objects to processing units. In one embodiment, the statistical measure may be defined such that it indicates a degree of smoothness of the distribution.

In step 62, it is determined whether the tentative distribution has a higher degree of smoothness in comparison to the actual distribution, i.e. the initial distribution for the first iteration of loop 54. If this is the case, the tentative reassignment is asserted and the object is reassigned to the recipient processing unit in step 64 which provides a new actual distribution. The new actual distribution forms the basis for the consecutive iteration of loop 54 with respect to the next object in the ordered sequence.

If the smoothness of the tentative distribution is not improved in comparison to the actual distribution, then the actual distribution is kept the same for the purpose of the consecutive iteration, as step 66.

After all objects of the ordered sequence have been processed in loop 54 or in cases where there are no donor or no recipient processing units, loop 54 stops.

As a result, the final distribution of objects to processing units having an improved smoothness in comparison to the initial distribution is output in step 68.

Figure 2:
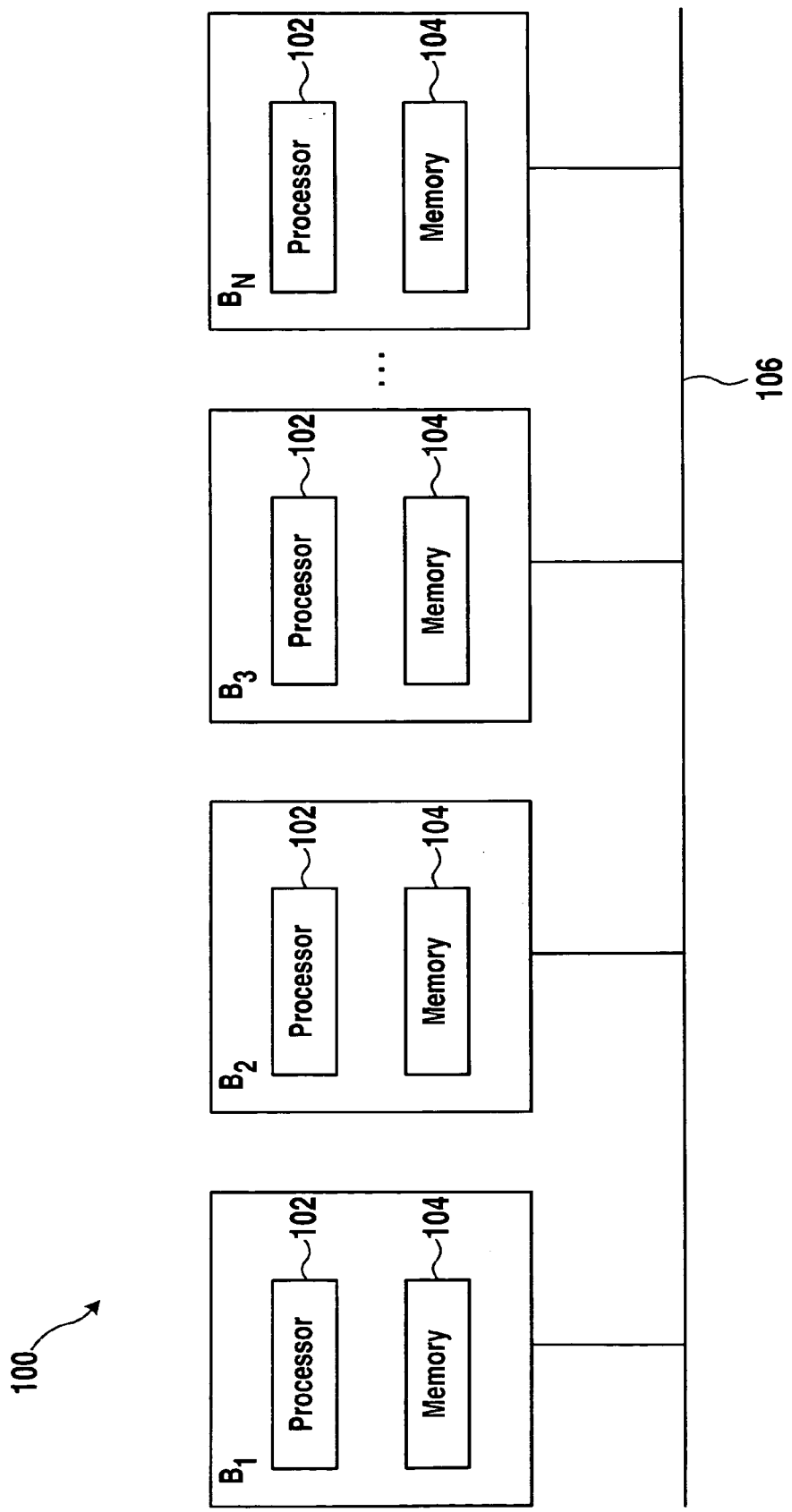
FIG. 2 is a schematic block diagram of an exemplary computer system having a cluster of blades.

FIG. 2 is a schematic block diagram of an exemplary computer system having a cluster of blades. In FIG. 2, an exemplary application of the method of FIG. 1 to blade computing is illustrated. As shown, cluster 100 may comprise one or more blades $B_1, B_2, B_3, \ldots, B_N$. Each one of the blades may include a processor 102 and a memory 104. In the example considered here, all memories 104 may have the same storage capacity. The blades are coupled by a network 106, such as a bus system or an external network connection. The number N of blades of cluster 100 needs to be chosen, such that a given number of M objects of varying sizes can be handled.

For example, cluster 100 may implement a so called search engine. In this instance, identical search processes may run on each one of the blades. The assignment of data objects, such as index tables, to blades can be stored in a dispatcher unit (not shown in the drawing) of cluster 100. This way, data objects are assigned to blades and data processing tasks running on the blades.

Figure 3:
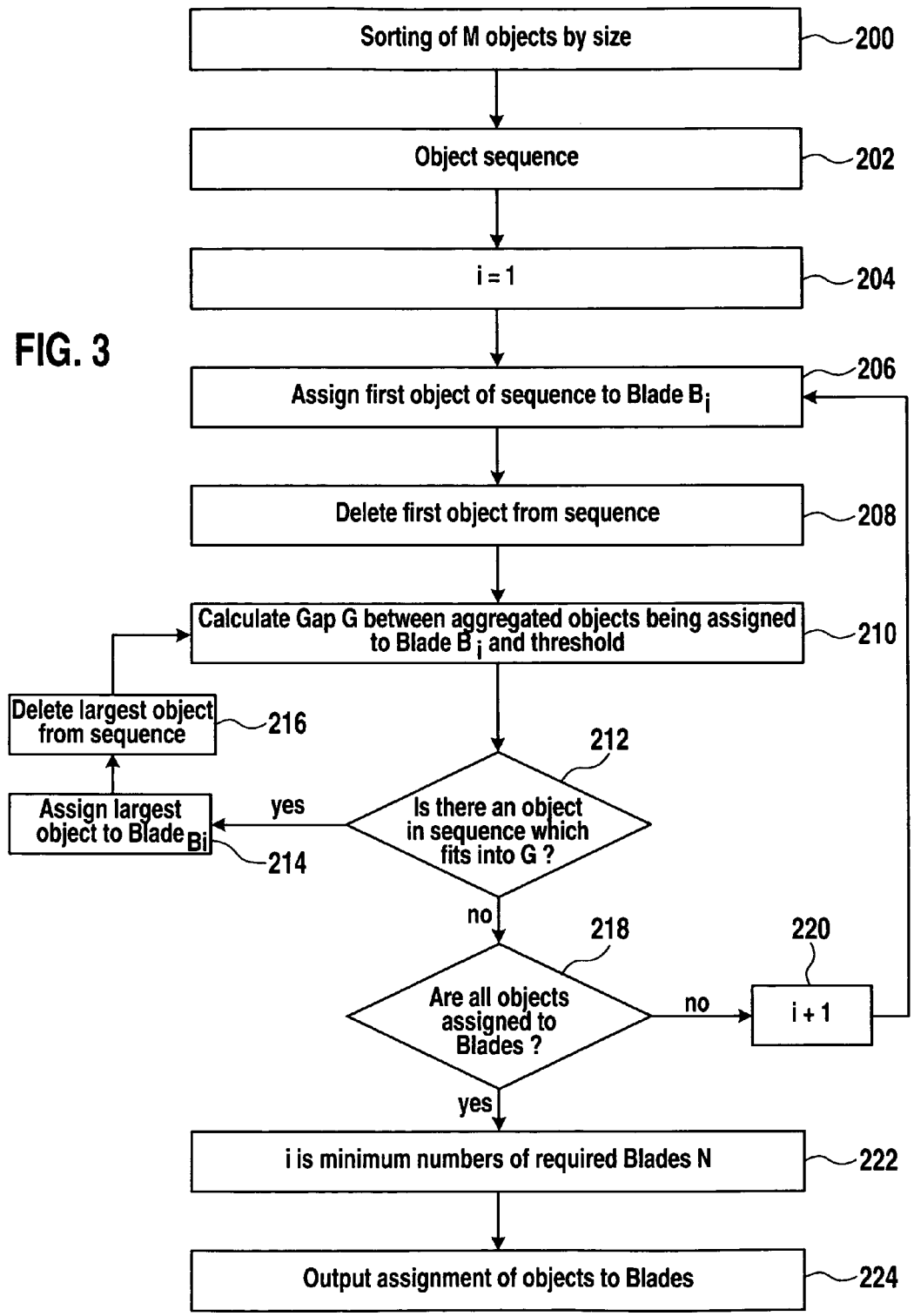
FIG. 3 illustrates a flow diagram of an exemplary method for assigning of objects to blades and for determining the minimum number of blades, consistent with an embodiment of the invention.

FIG. 3 is a flow diagram of an exemplary method for assigning objects to blades and, thereby, determining the minimum value for N.

In step 200, a sorting operation is performed in order to sort the M objects by size. The corresponding object sequence is provided in step 202. In step 204, the index i for the blades is initialized to one.

In step 206, processing of the object sequence starts in the order starting with the largest object of the sequence. The first object of the sequence, which by definition is the largest object of the sequence, is assigned to blade $B_1$ in step 206. In step 208, the first object which has been assigned to blade $B_1$ is deleted from the sequence.

In step 210, the size of the objects, which have been already assigned, to blade $B_1$ is added up and a gap G between the aggregated object size and a threshold is calculated. When the assignment procedure of FIG. 3 is carried out for the first time, the threshold is the storage capacity of one of the blades.

In step 212, it is determined whether there remains an object in the sequence, which fits into the gap G. If this is the case, the largest of these objects is assigned to the blade $B_1$ in step 214 and deleted from the sequence in step 216 before the control goes back to step 210.

If there is no such object which fits into the gap G, step 218 is carried out. In step 218, it is determined whether all objects have already been assigned to blades. In other words, in step 218 it is checked whether the sequence is empty. If this is not the case, the index i is incremented in step 220 and the control goes back to step 206 to assign remaining objects of the sequence of the next blade $B_2$.

If the contrary is the case, the index i equals the minimum number N of blades which are required to handle the M objects. This number is output in step 222. By way of example, the minimum number N of blades can be a basis for an investment decision for purchasing of a corresponding number of blades. Further, the assignment of objects to blades is output in step 224 in order to visualize the quality of the object size balancing.

Figure 4:
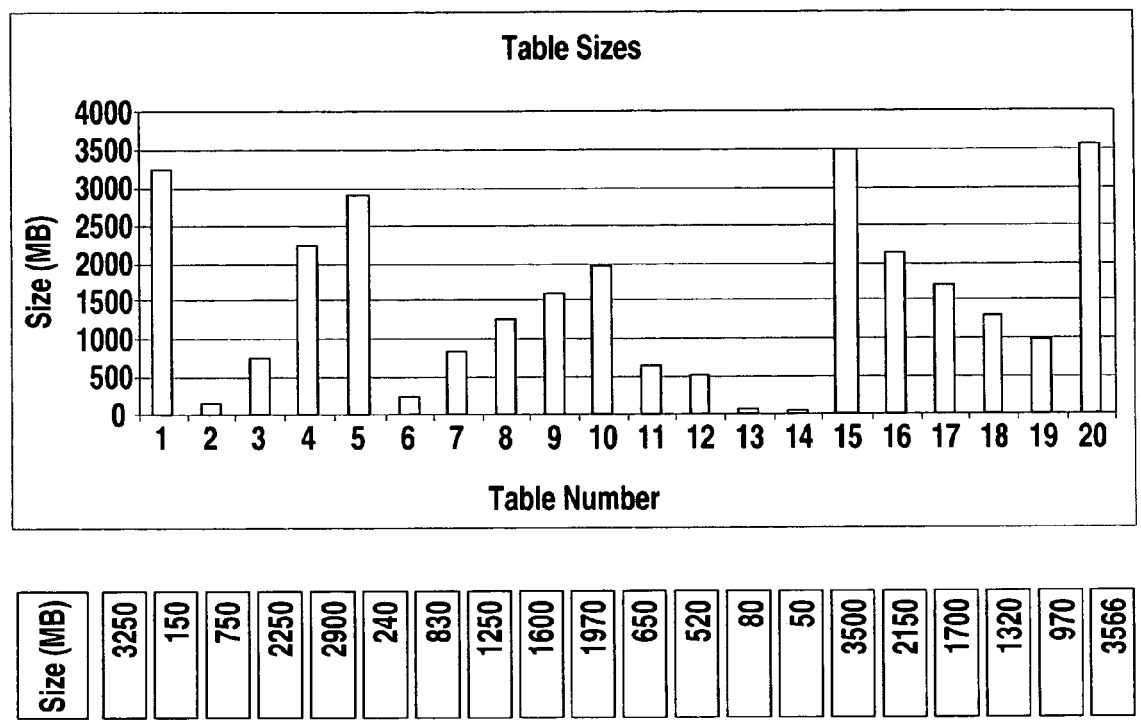
FIG. 4 is an example of tables that may need to be assigned to blades.

FIG. 4 shows an example of tables. In the example considered here, the objects are a number of twenty different tables having various sizes between, for instance, 50 MB and 3566 MB. For example, table 1 has a size of 3250 MB, table 2 has 150 MB, and table 3 has 750 MB, etc. The table sizes can be actual table sizes or average table sizes which have been obtained by monitoring a real life data processing system. Alternatively, the table sizes are estimates for the purpose of planning cluster 100.

Figure 5:
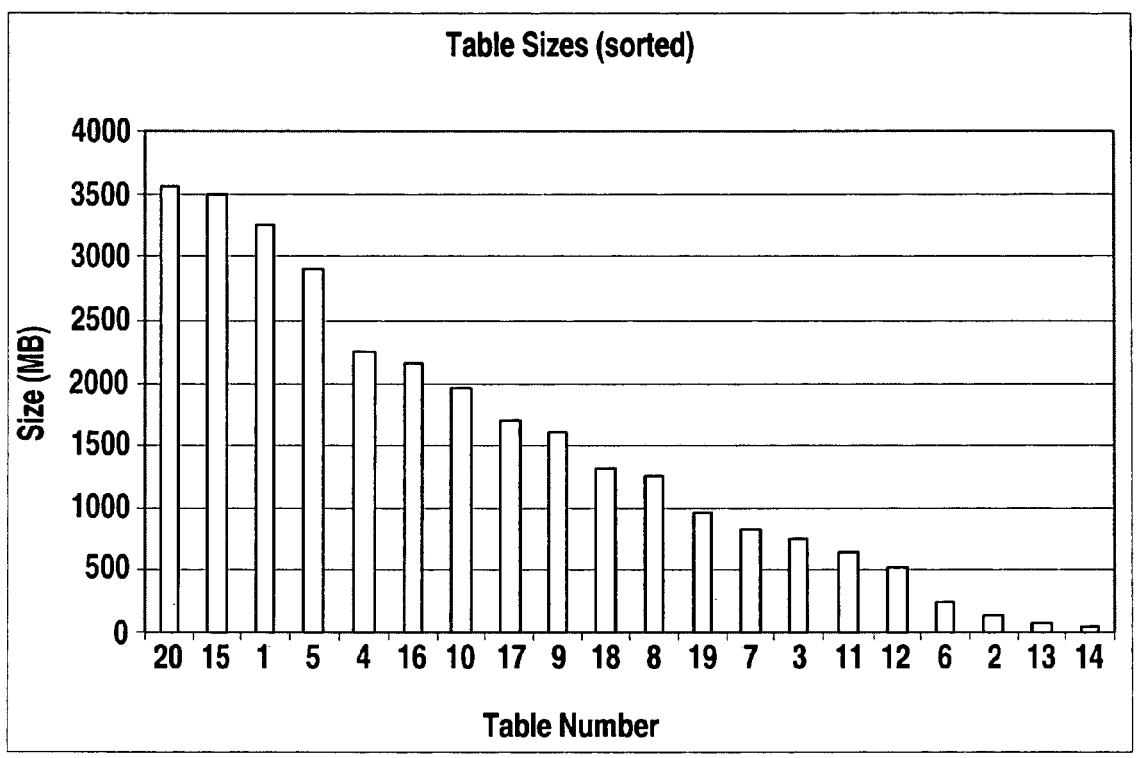
FIG. 5 shows an exemplary result of a sorting operation.

FIG. 5 show, by way of example, the result of a sorting operation. The sorting operation may be performed on tables 1 to 20 of FIG. 4 consistent with, for example, steps 200 and 202 of FIG. 3.

Figure 6:
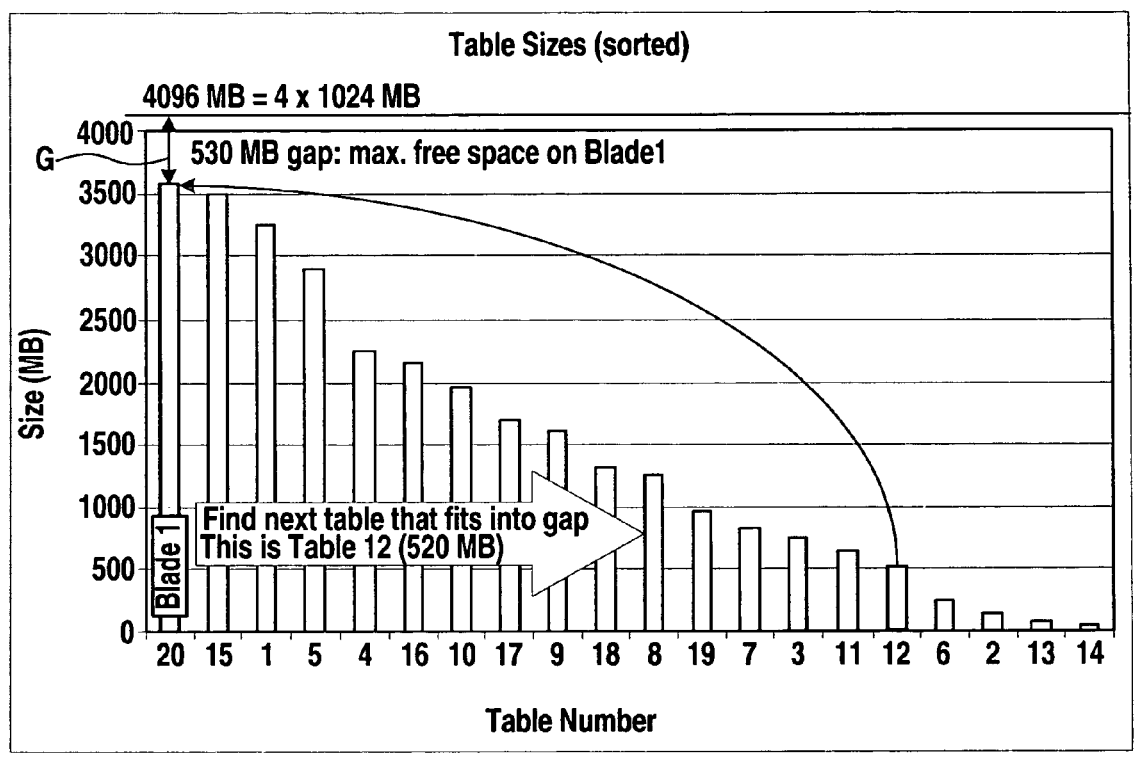
FIG. 6 shows an exemplary first step of assigning a table to a first one of the blades.

FIG. 6 illustrates, by way of example, the assignment of the first object of the sequence, i.e. the largest table 20 to blade $B_1$. In the example considered here, assume each blade has a storage capacity of 4 GB=4096 MB of main memory. Table 20 has a size of 3566 MB, which leaves a gap G of 530 MB of remaining storage capacity (cf. step 210 of FIG. 3).

Figure 7:
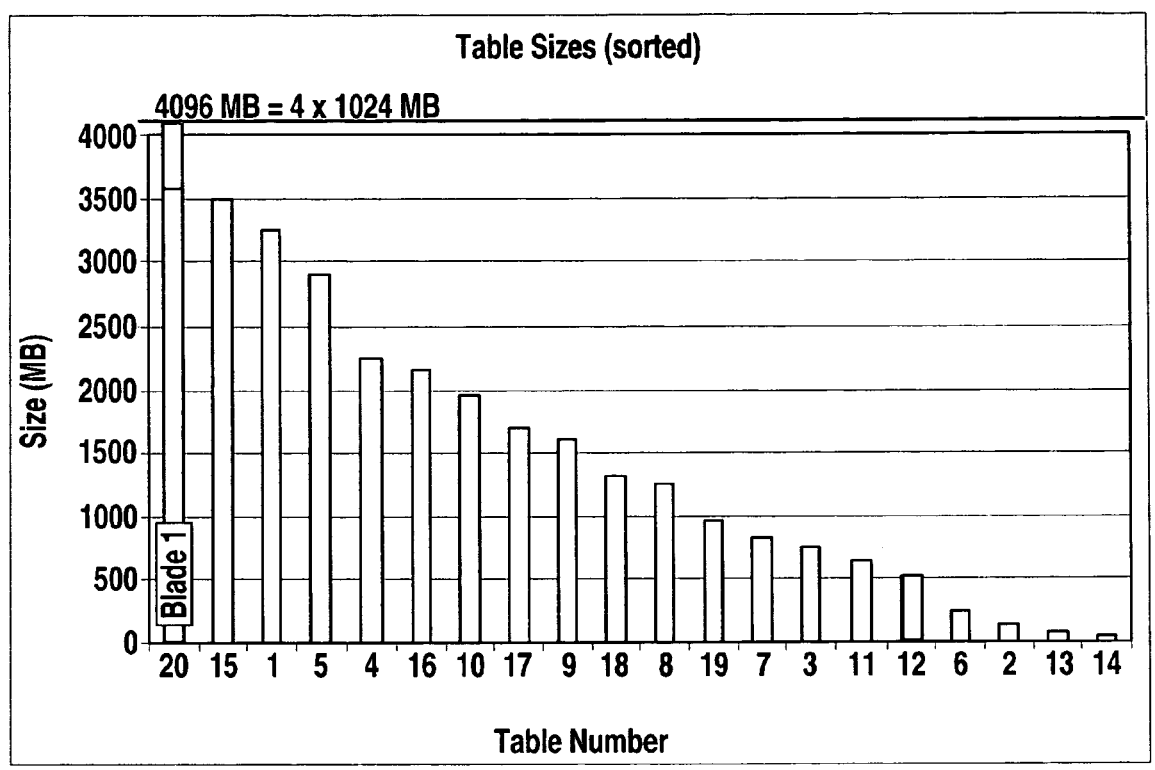
FIG. 7 shows an exemplary second step for assigning a table to the first blade.

Next, it is determined whether there is a next object in the sequence which fits into the gap G. Table 12, which has a size of 520 MB is the largest table which fits into the gap G. This table 12 is, thus, also assigned to blade 1. The aggregated size of the objects assigned to blade 1, i.e. table 20 and table 12, is 4068 MB, which leaves a gap G of 10 MB (cf. FIG. 7). This gap G of 10 MB is too small to accommodate even the smallest remaining object of the sequence of tables.

As there remain tables in the sequence which have not yet been assigned to a blade, the index i may be incremented and the assignment procedure goes to the next blade $B_2$ (cf. steps 218 and 220 of FIG. 3). With respect to blade $B_2$, the above-explained procedure is carried out again on the basis of the unassigned tables, which remain in the sequence.

This way the largest remaining table of the sequence, i.e. table 15, is assigned to blade $B_2$ which leaves a gap G of 596

Figure 8:
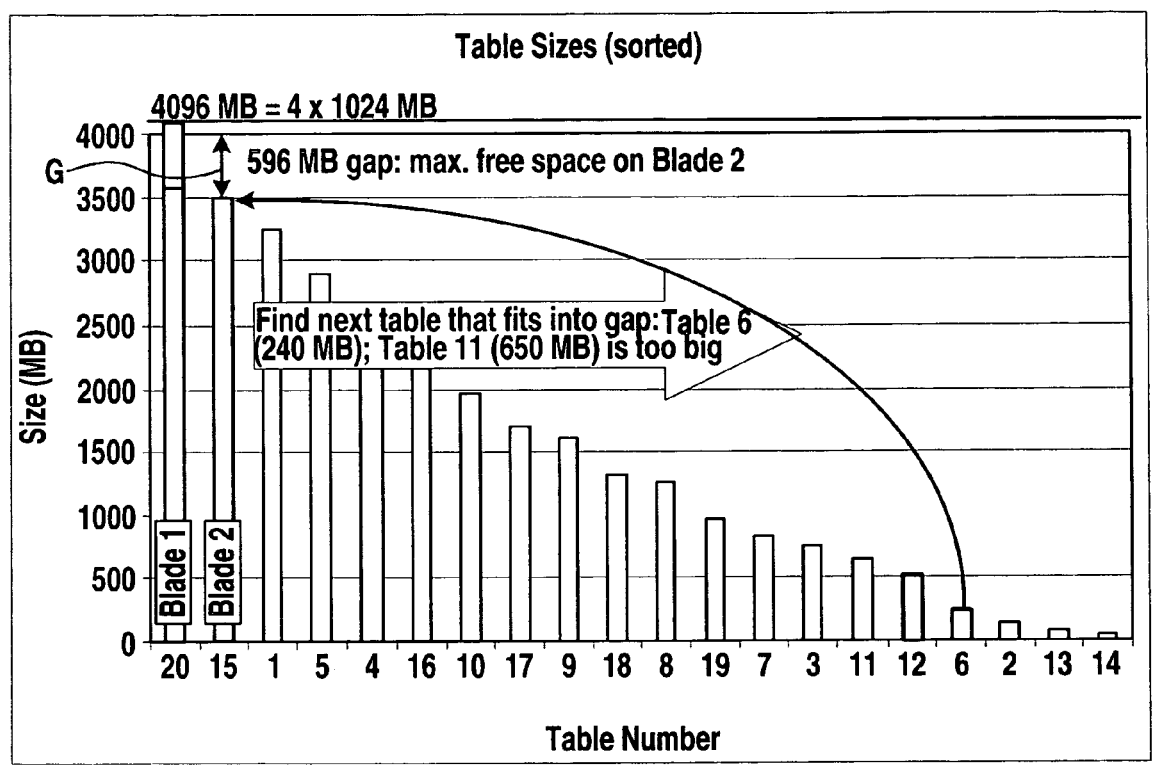
FIG. 8 shows, by way of example, the first assignment of a table to a second blade.
Figure 9:
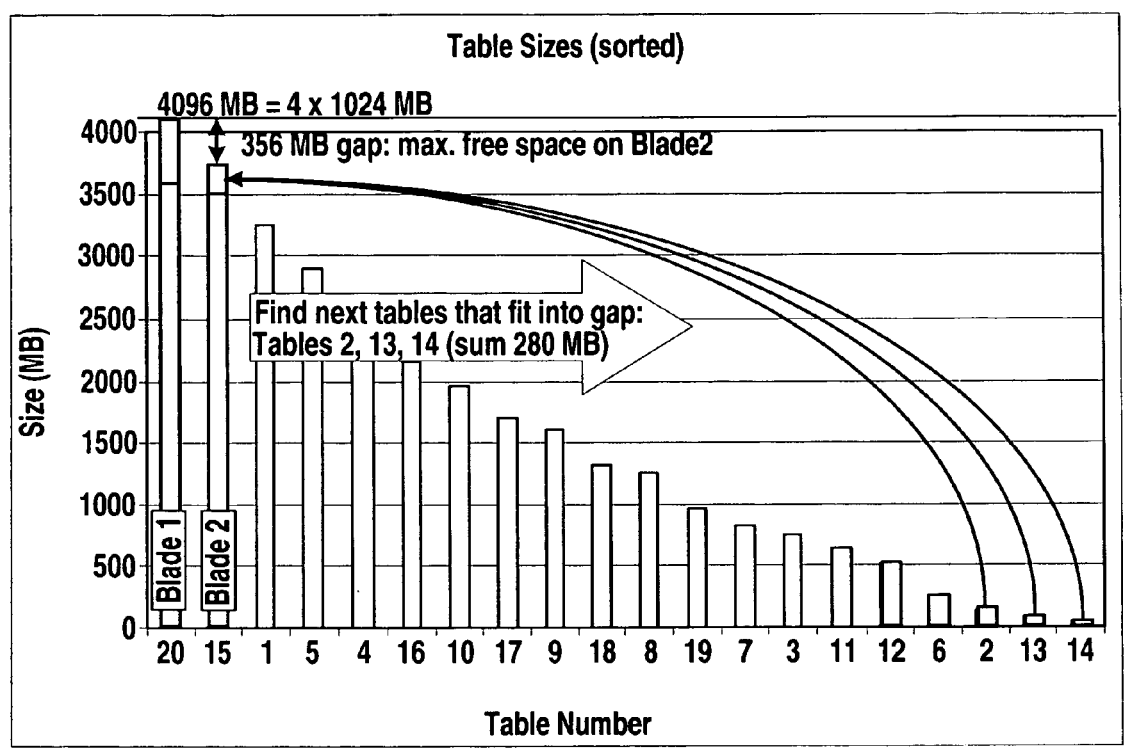
FIG. 9 shows, by way of example, a second assignment of a table to the second blade.
Figure 10:
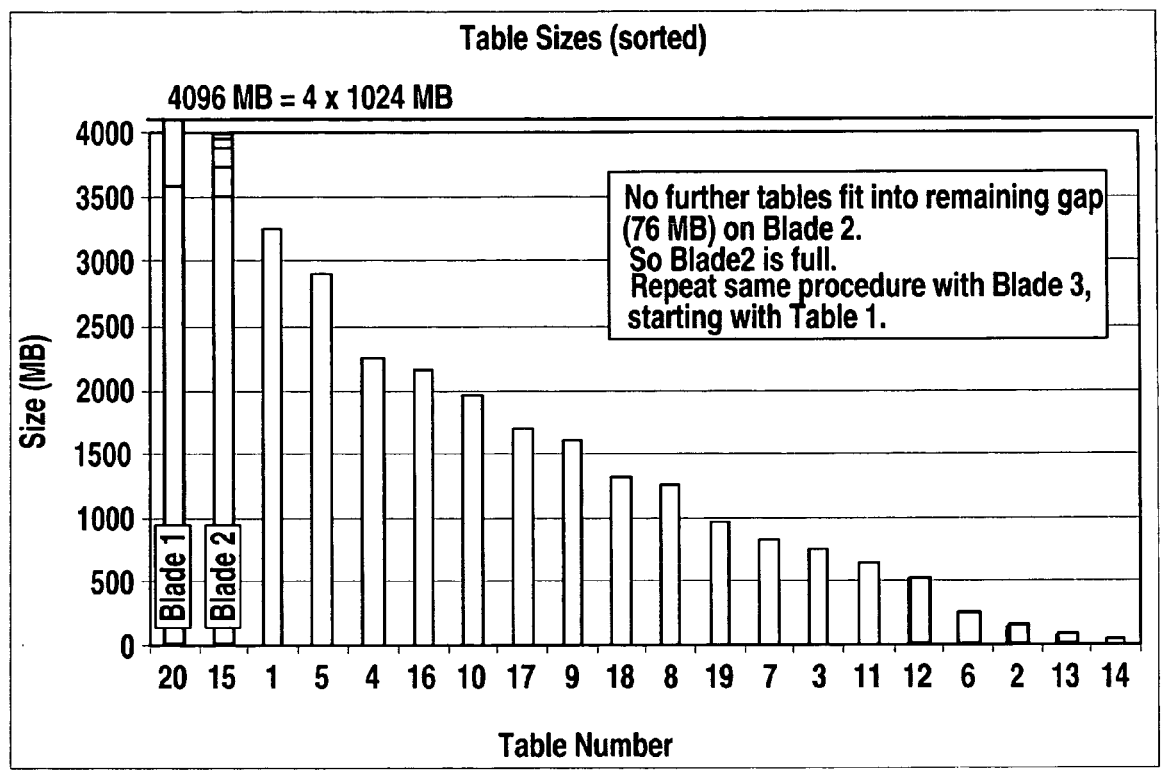
FIG. 10 shows, by way of example, the assignment of 3 further tables to the second blade.

MB. The gap G is filled with tables 6, 2, 13 and 14 as illustrated in FIGS. 8 and 9. The resulting assignment of tables to blade B₂ is shown in FIG. 10.

The aggregated size of the tables, which have been assigned to blade B2, i.e. tables 15, 6, 2, 13 and 14, leave a gap G of 76 MB which is not enough to accommodate the smallest unassigned table, i.e. table 11, of the sequence. Thus, the index i is incremented and the assignment procedure is continued for the next blade B₃. This process goes on until all tables of the sequence have been assigned to one blade B$_i$. The result of the assignments of tables to blades is illustrated in FIG. 11.

In addition to the assignment of tables to blades this way, the minimum number N of blades, which are required for handling of the given number of tables (cf. FIG. 3), is obtained. In the example considered here, the resulting assignment of tables to the N=8 blades leaves a gap G of 2196 MB on blade 8.

Figure 11:
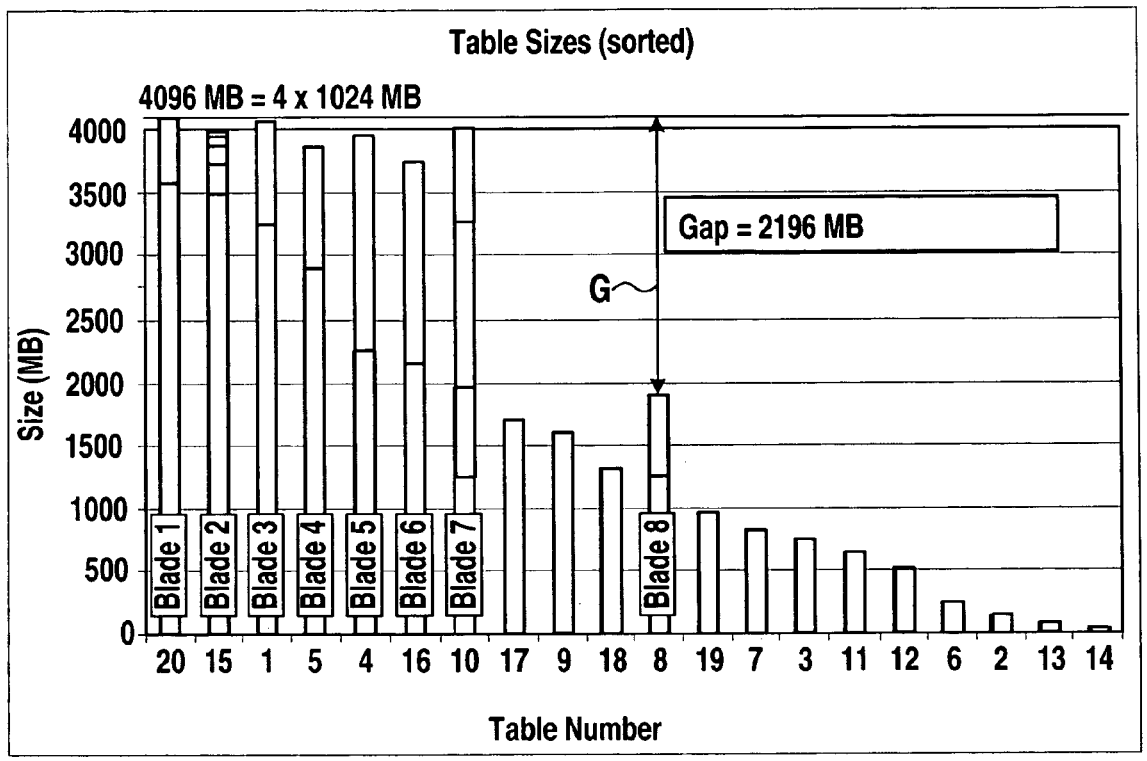
FIG. 11 shows, by way of example, the resulting assignment of tables to blades as a result of the assignment procedure.

The resulting distribution as shown in FIG. 11 may be entered as the initial distribution into the exemplary method of FIG. 1 (cf. step 52 of FIG. 1). Further, the ordered sequence of the tables as shown in FIG. 5 may be entered in step 50 of the exemplary method of FIG. 1. On this basis, the method of FIG. 1 may be performed in order to improve the smoothness of the initial distribution of FIG. 11. The corresponding iterations of the redistribution procedure are illustrated, by way of example, in FIGS. 12 to 24:

First, a threshold is calculated that serves to differentiate donor and recipient blades. In one embodiment, the threshold may be the theoretical storage capacity minimum per blade that would be required for a perfectly even distribution of the aggregated object sizes per blade. The further processing is aimed to approximate this ideal situation despite the fact that the object size, e.g. the tables sizes, are finite and vary.

In the example, the sum of all table sizes of tables 1 to 20 is 29696 MB. Thus, the threshold is 29696 MB divided by 8, i.e. the number of blades, which yields threshold T=3712 MB. Blades having aggregated table sizes above threshold T are by definition donor blades whereas blades having aggregated table sizes of below threshold T are by definition recipient blades. Taking the initial distribution of tables to blades provided by the method of FIG. 3 as a starting point blades 1 to 7 are donor blades whereas blade 8 is a recipient blade.

After the donor and recipient blades have been identified, the processing of the tables starts in the order of the sorted sequence, starting with the largest table in the ordered sequence. In other words, the processing starts with the left most table in the sequence, i.e. table 20, from where it proceeds to the smallest table in the sequence, i.e. table 14 (cf. the ordered sequence as shown in FIG. 5).

Recipient blade 8 has the storage capacity of 4096 MB. Tables 8 and 11 are assigned to blade 8 which have a total size of 1900 MB. Thus, there is a gap G of remaining storage capacity of recipient blade 8 which can be used for reassigning of a table from one of the donor blades.

Figure 13:
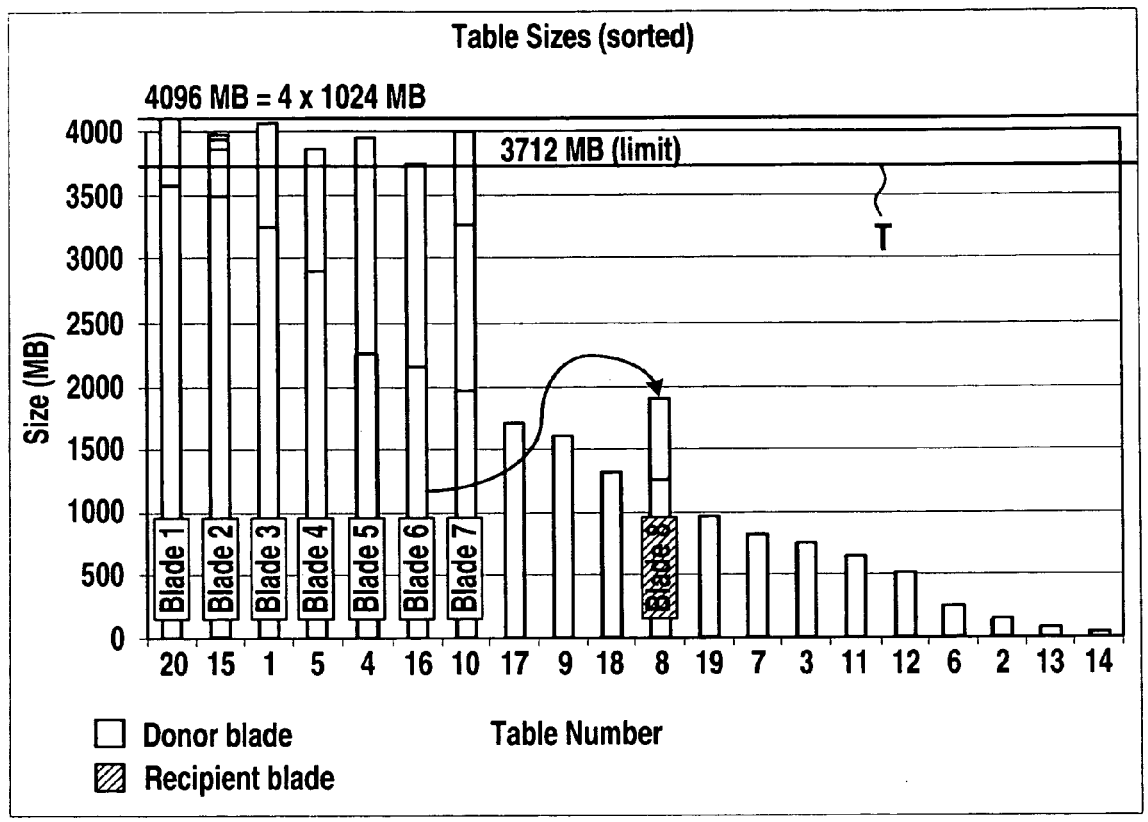
FIG. 13 is an exemplary illustration of a tentative reassignment of table 16 to blade 8.

By processing of the tables in the order of the sequence, it is determined that tables 20, 15, 1, 5 and 4 do not fit into gap G of recipient blade 8 and can thus not be reassigned. However, table 16 on donor blade 6 has a size of 2150 which fits into gap G=4096 MB−1900 MB=2196 MB. Table 16 is thus tentatively moved from the donor blade 16 to recipient blade 8, as illustrated in FIG. 13. In order to assess the quality of the resulting tentative distribution, statistical measures may be used.

Figure 12:
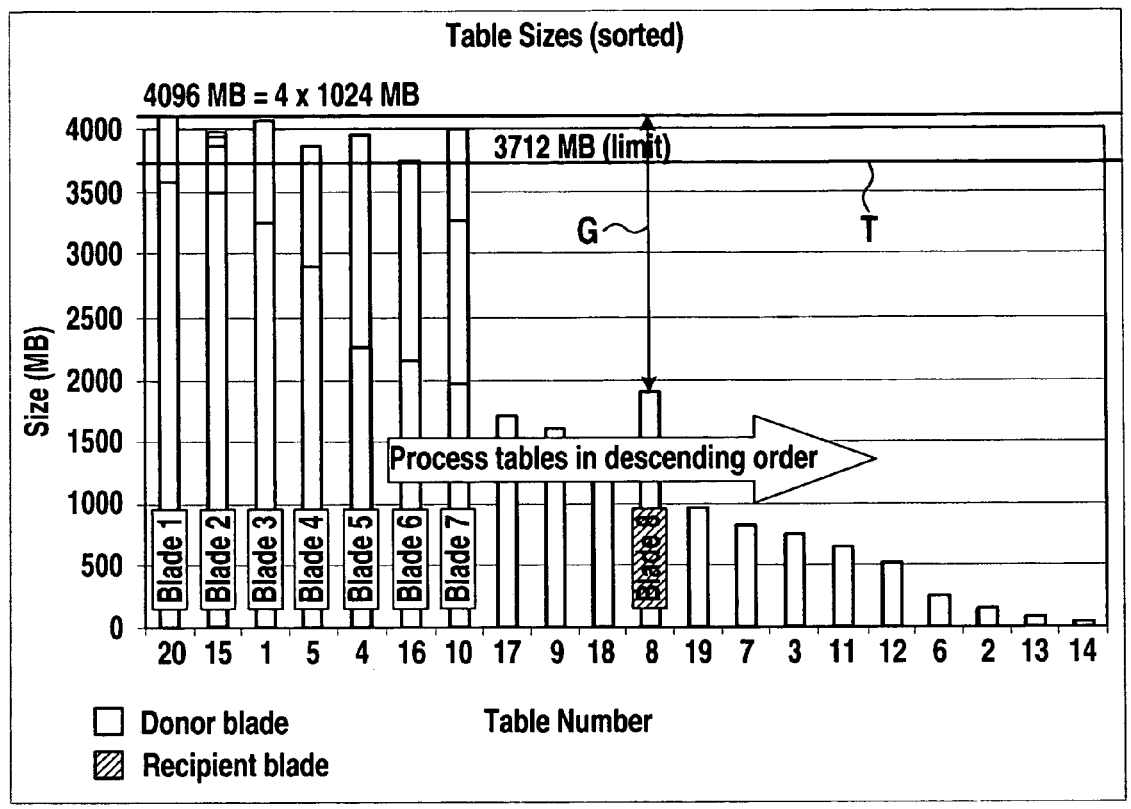
FIG. 12 is an exemplary illustration of the differentiation between donor and recipient blades in the initial distribution shown in the example of FIG. 11.

In accordance with one embodiment, the statistical measure is the standard deviation of the aggregated table sizes per blade. The standard deviation S of the initial distribution as shown in FIGS. 11 and 12 is 741.06 MB. The standard deviation of the tentative distribution of tables to blades that is obtained when table 16 is moved to recipient blade 8 is S=856.42 MB. Hence moving table 16 to recipient blade 8 increases the standard variance S. This indicates that the smoothness of the distribution of tables to blades deteriorates in the tentative distribution. Therefore this tentative distribution is dropped and no reassignment is made.

Figure 14:
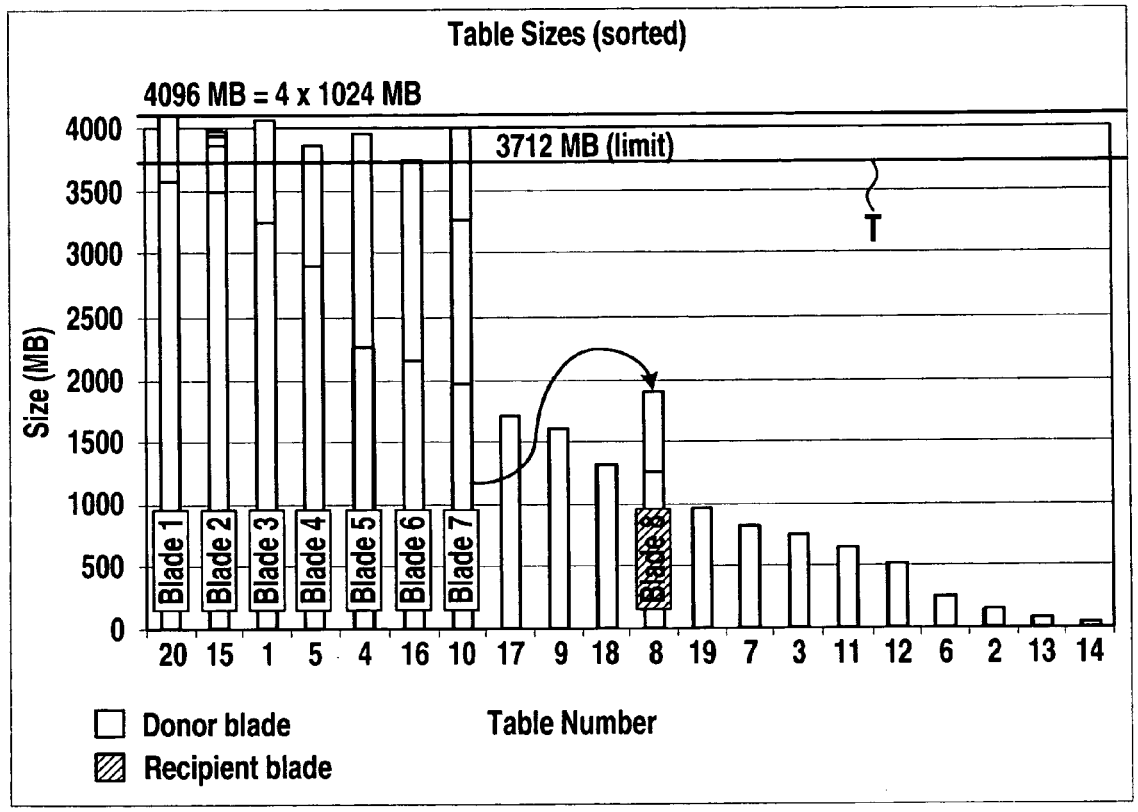
FIG. 14 is an exemplary illustration of the tentative reassignment of table 10 from blade 7 to blade 8.

From here, the control may proceed to processing of the next table in the sequence, i.e. table 10 on donor blade 7. Table 10 fits into gap G and is thus tentatively moved from donor blade 7 to recipient blade 8, as illustrated in FIG. 14. The standard deviation of the tentative distribution of tables to blades that is thus obtained is S=673.41 MB, which is below the standard deviation of the initial distribution.

As a consequence, the tentative distribution of FIG. 14 is accepted and table 10 is in fact moved from donor blade 7 to recipient blade 8. This move makes blade 8 a donor blade as the total size of the tables that are assigned to blade 8 surpasses threshold T. Likewise, the move of table 10 makes blade 7 a recipient blade as the total size of the tables that remain assigned to blade 7 drops below threshold T.

Figure 15:
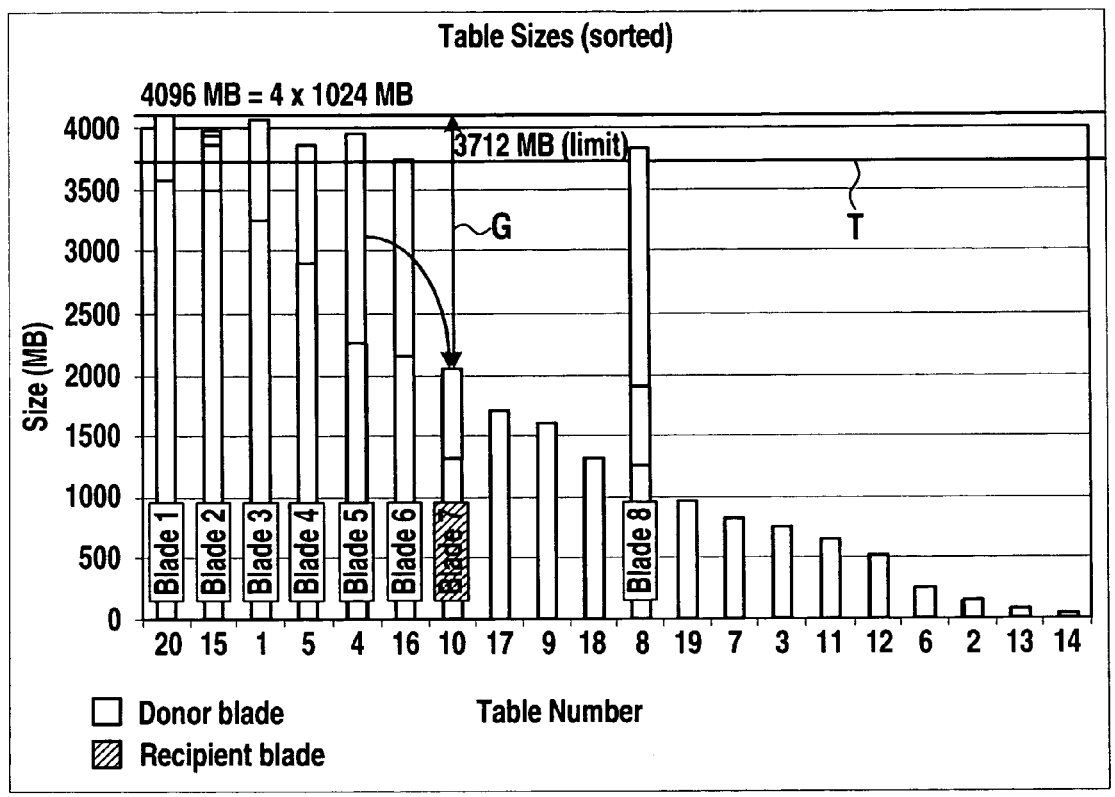
FIG. 15 is an exemplary illustration of the tentative reassignment of table 17 from blade 5 to blade 7.

The processing of the tables continues in accordance with the ordered sequence. The next table in the ordered sequence is table 17 that had been assigned to donor blade 5. As table 17 fits into gap G of recipient blade 7 it is tentatively moved there. The standard deviation of the resulting tentative distribution is S=605.02 MB which is below the standard deviation of the actual distribution obtained from the previous move of table 10 to blade 8. Thus, the tentative distribution is accepted and table 17 is moved to recipient blade 7, as shown in FIG. 15.

Figure 16:
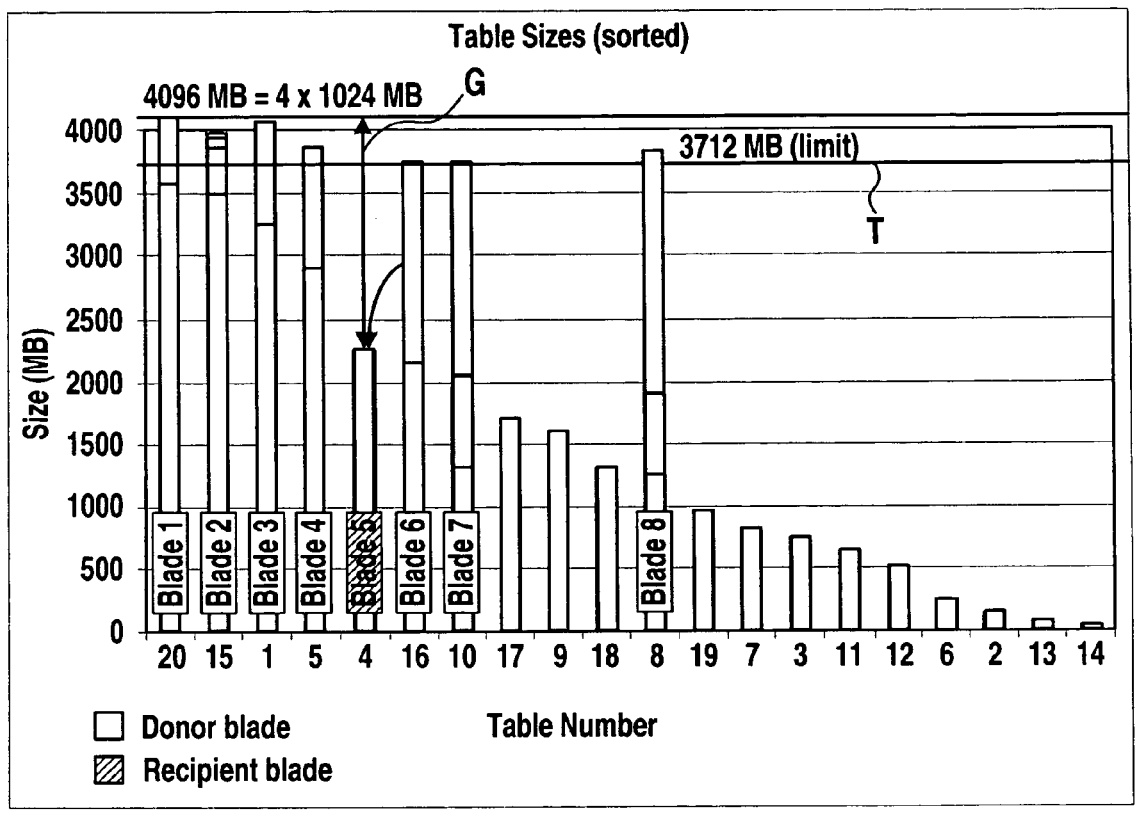
FIG. 16 is an exemplary illustration of a situation where there is no sufficient remaining storage capacity on a recipient blade.

The next table in the sequence is table 9, which had been assigned to blade 6. In the actual distribution of tables to blades, which is obtained from the previous iteration, blade 5 is a recipient blade whereas all the other blades are donor blades. Table 9 fits into gap G of recipient blade 5, as illustrated in FIG. 16. Table 9 is thus tentatively moved to blade 5, but this results in an increase of the standard deviation from 605.02 MB to 673.61 MB. Hence, the distribution is not changed in this iteration and the processing continues with the next smallest table in the sequence, i.e. table 18.

Figure 17:
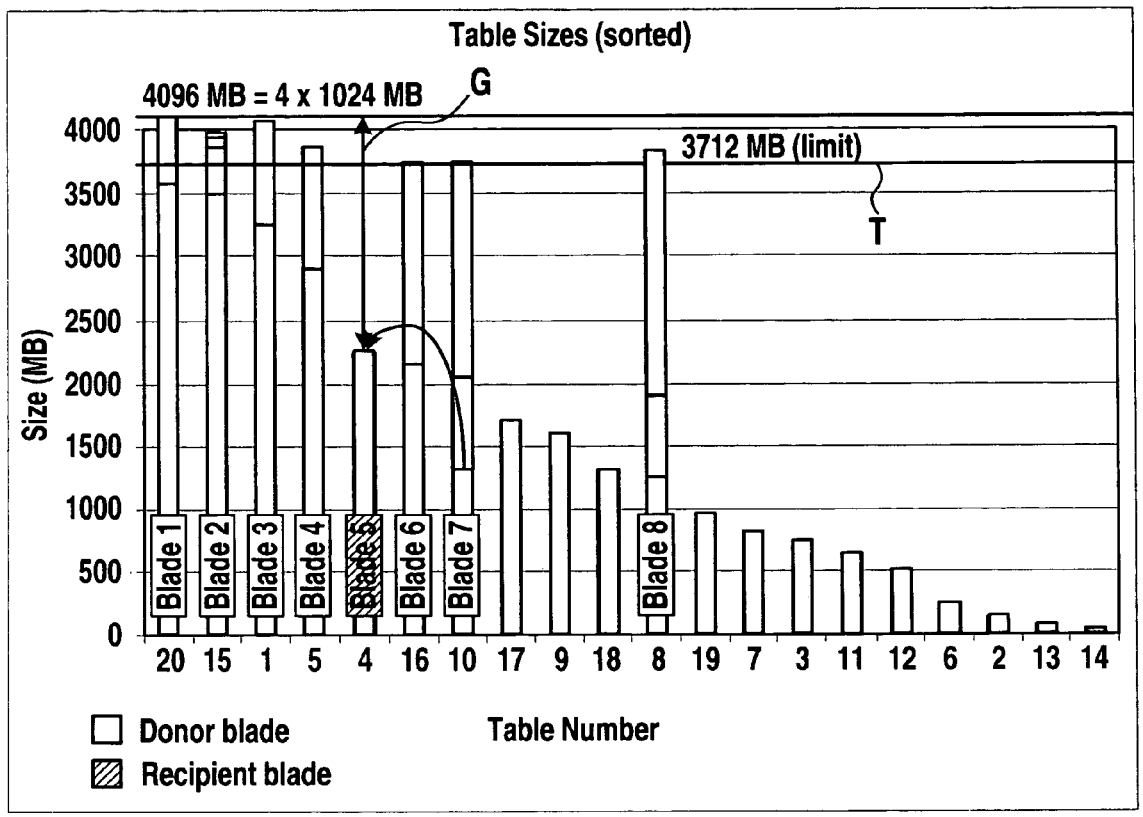
FIG. 17 is an exemplary illustration of a tentative reassignment of table 18 from blade 7 to blade 5.

Table 18 does in fact fit into gap G and is thus tentatively moved from donor blade 7 to recipient blade 5. The resulting standard deviation S is 539.09 MB which is below the actual standard deviation of 605.02 MB obtained from the previous iteration. Thus, the tentative distribution of FIG. 17 is accepted and table 18 is reassigned to blade 5.

Figure 18:
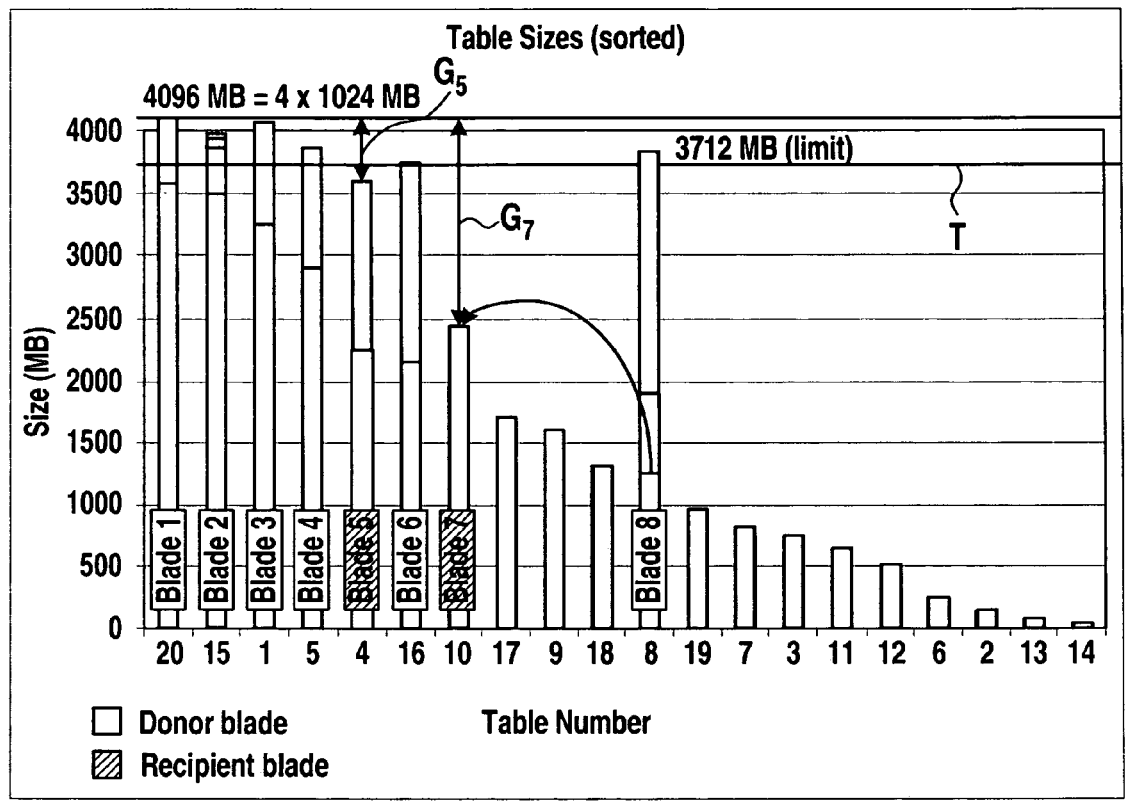
FIG. 18 is an exemplary illustration of a tentative reassignment of table 8 from blade 8 to blade 7.

The next table in the sequence is table 8 that had been assigned to blade 8. In the actual distribution obtained from the previous iteration, blades 5 and 7 are recipient blades whereas all other blades are donor blades. Table 8 is on donor blade 8 and does not fit into gap G₅ of recipient blade 5. However, table 8 does fit into gap G₇ of recipient blade 7 and is thus tentatively moved to recipient blade 7. In the resulting tentative distribution, the new standard deviation is 479.49 MB which is below the actual standard deviation of S=539.09 MB. The tentative distribution of FIG. 18 is thus accepted and table 18 is in fact moved from donor blade to recipient blade 7.

Figure 19:
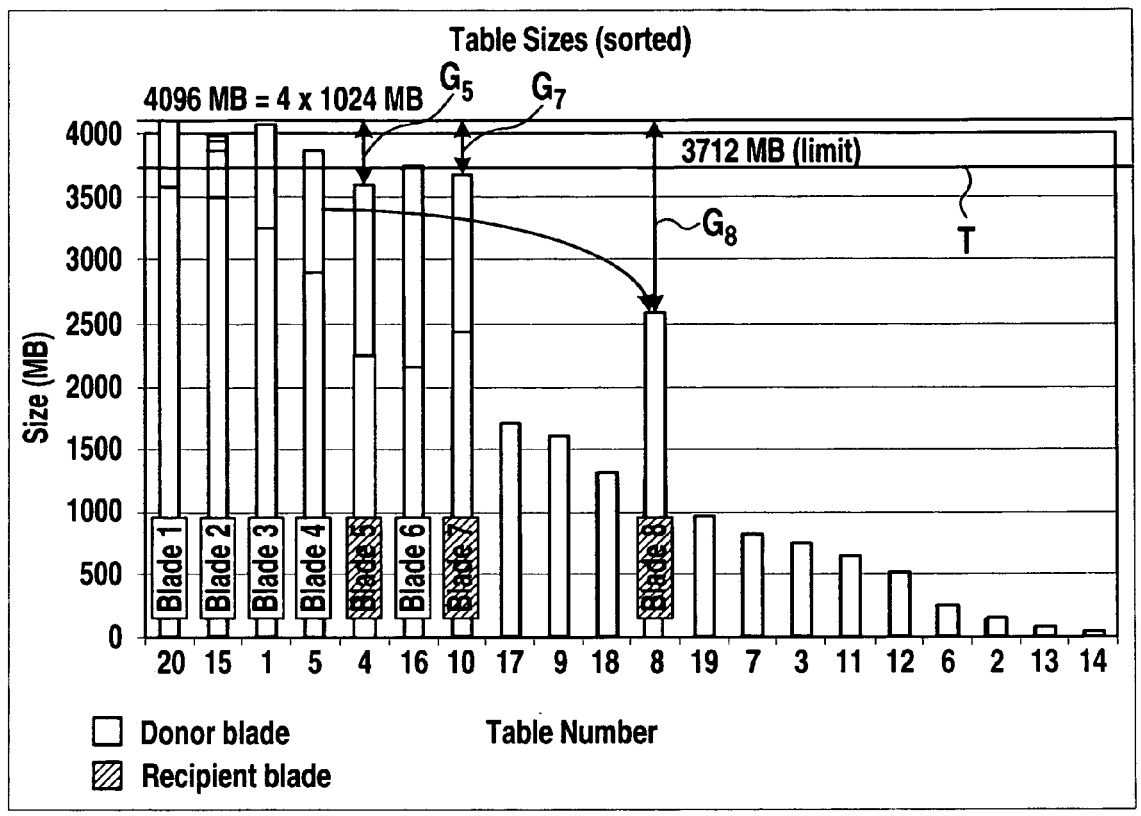
FIG. 19 is an exemplary illustration of a tentative reassignment of table 19 from blade 4 to blade 8.
Figure 20:
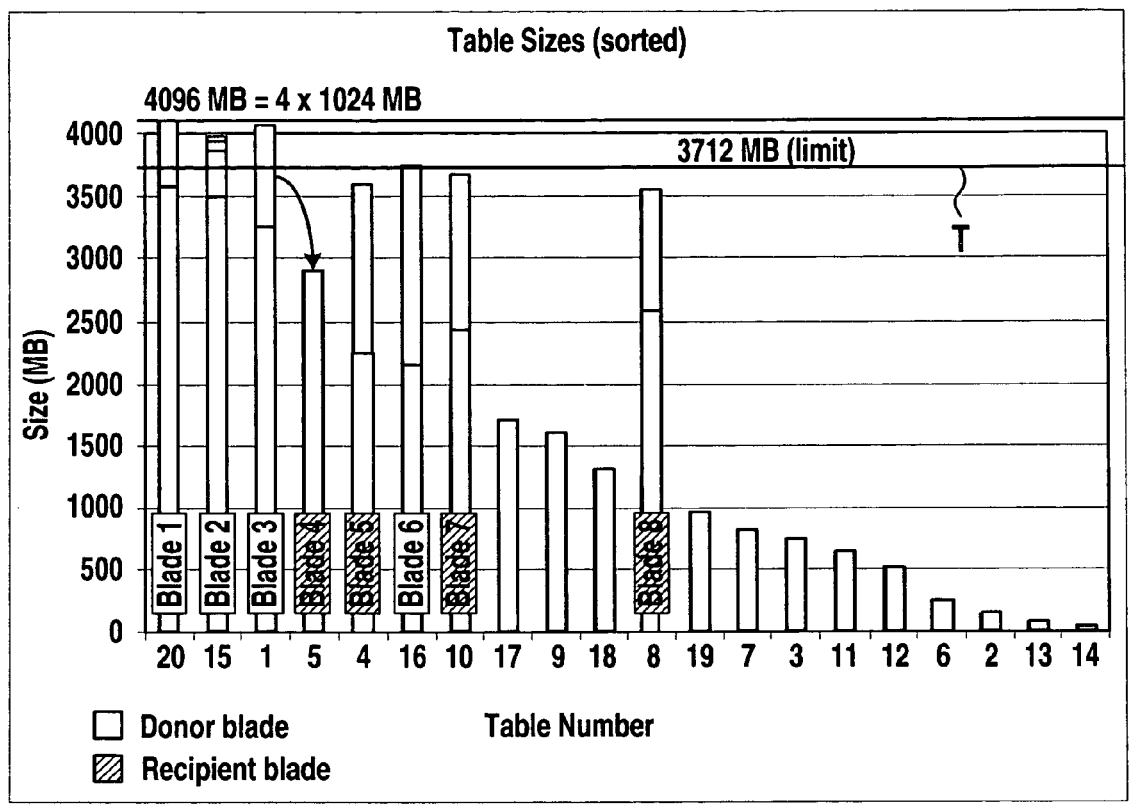
FIG. 20 is an exemplary illustration of a tentative reassignment of table 7 from blade 3 to blade 4.

The next table in the sequence is table 19. In the actual distribution obtained from the previous iteration, blades 5, 7 and 8 are recipient blades while all other blades are donor blades. Table 19 is on a donor blade. Gaps G₅ and G₇ of recipient blades 5 and 7 are too small to accommodate table 19. Table 19 is thus moved to recipient blade 8 which has a sufficiently large gap G₈ to accommodate table 19. The standard deviation for the resulting tentative distribution is 390.36 MB which is below the actual standard deviation obtained from the previous iteration. The tentative distribution of FIG. 19 is thus accepted and table 19 is in fact moved from donor blade 4 to recipient blade 8.

The next table in the ordered sequence is table 7 on blade 3. Blades 4, 5, 7 and 8 are recipient blades in the actual distribution. Table 7 is tentatively moved from donor blade 3 to recipient blade 4 as table 7 is too large to fit on the other recipient blades. The resulting standard deviation of the new tentative distribution is 263.26 MB which is below the actual standard deviation obtained from the previous iteration. Table 7 is therefore reassigned from donor blade to recipient blade 4.

Figure 21:
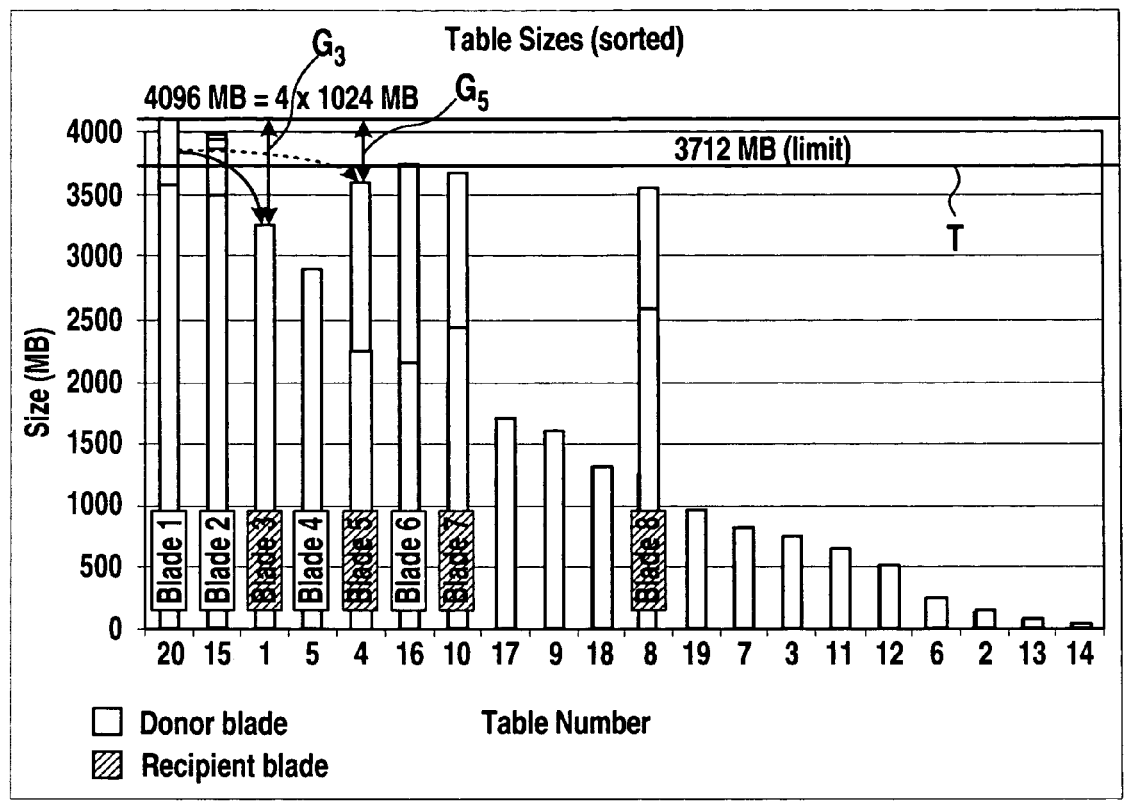
FIG. 21 is an exemplary illustration of a tentative reassignment of table 12 to recipient blades 3 and 5.

The resulting actual distribution is shown in FIG. 21. In this distribution, blades 3, 5, 7 and 8 are recipient blades. The next table in the sequence is table 3 which is assigned to recipient blade 7. Table 3 is skipped therefore. The same applies for table 11 because it is assigned to recipient blade 8 and can thus not be moved to a donor blade by definition.

Figure 22:
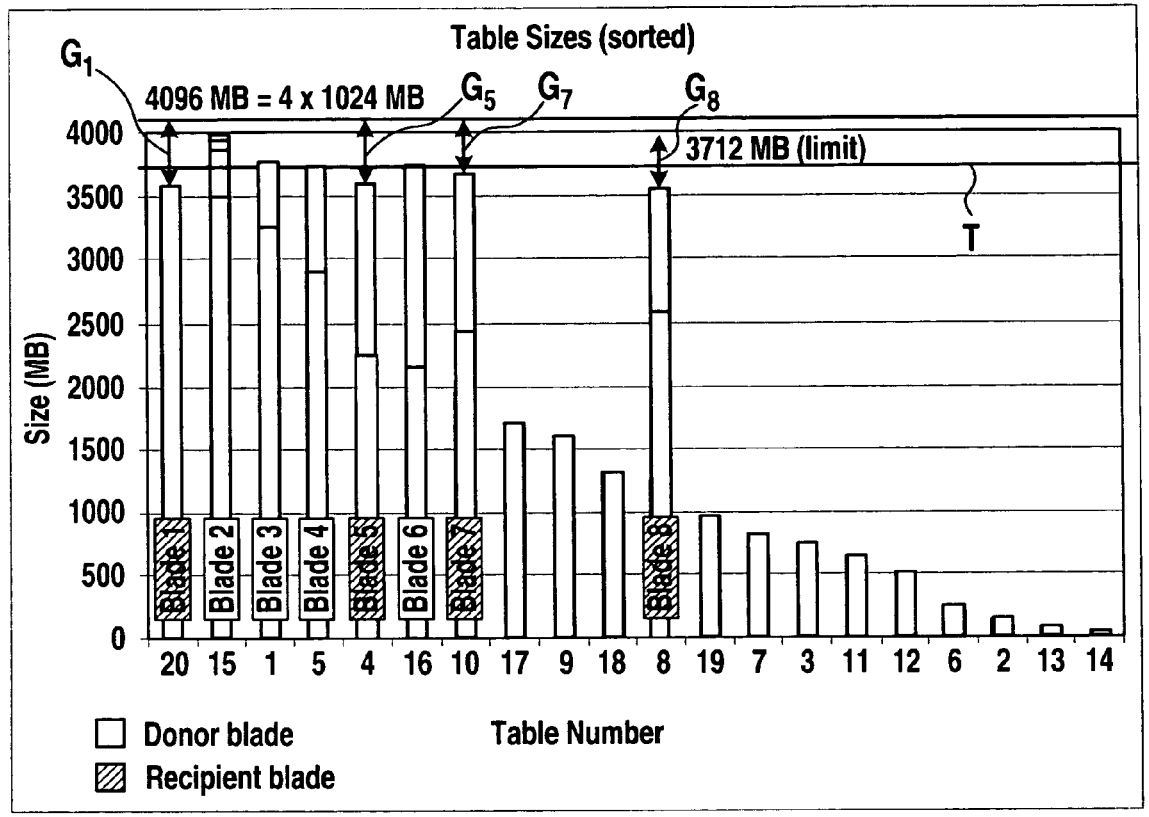
FIG. 22 is an exemplary illustration of multiple tentative reassignments of table 6 to blades 1, 5, 7 and 8.

The next table in the ordered sequence that is assigned to a donor blade is table 12 on blade 1. Table 12 fits into gaps $G_3$ and $G_5$ of recipient blades 3 and 5, respectively and is thus tentatively moved both to recipient blade 3 and recipient blade 5. This results in two competing tentative distributions. When table 12 is tentatively moved to table 3 the resulting new standard deviation of the corresponding tentative distribution is 149.53 MB. In contrast, when table 12 is moved to recipient blade 5 the resulting new standard deviation of the corresponding tentative distribution is 264.39 MB. Thus, the tentative distribution which is obtained when table 12 is moved to blade 3 is smoother than the alternative tentative distribution obtained by tentatively moving table 12 to blade 5. Hence, the tentative distribution obtained by moving table 12 to recipient blade 3 is accepted. The resulting new distribution is shown in FIG. 22.

In the new distribution, blades 1, 5, 7 and 8 are recipient blades. The next table in the ordered sequence is table 6 which is assigned to donor blade 2. Table 6 is small enough to fit into gaps $G_1$, $G_5$, $G_7$, and $G_8$ of the respective recipient blades 1, 5, 7 and 8. This results in four competing tentative distributions:

| Tentative Distribution | New Standard Deviation |
| --- | --- |
| Table 6 to blade 1 | 87,66 MB |
| Table 6 to blade 5 | 89,21 MB |
| Table 6 to blade 7 | 129,89 MB |
| Table 6 to blade 8 | 96,59 MB |

Hence, the tentative distribution obtained by moving table 6 to recipient blade 1 yields the smallest new standard deviation and is thus accepted.

Figure 23:
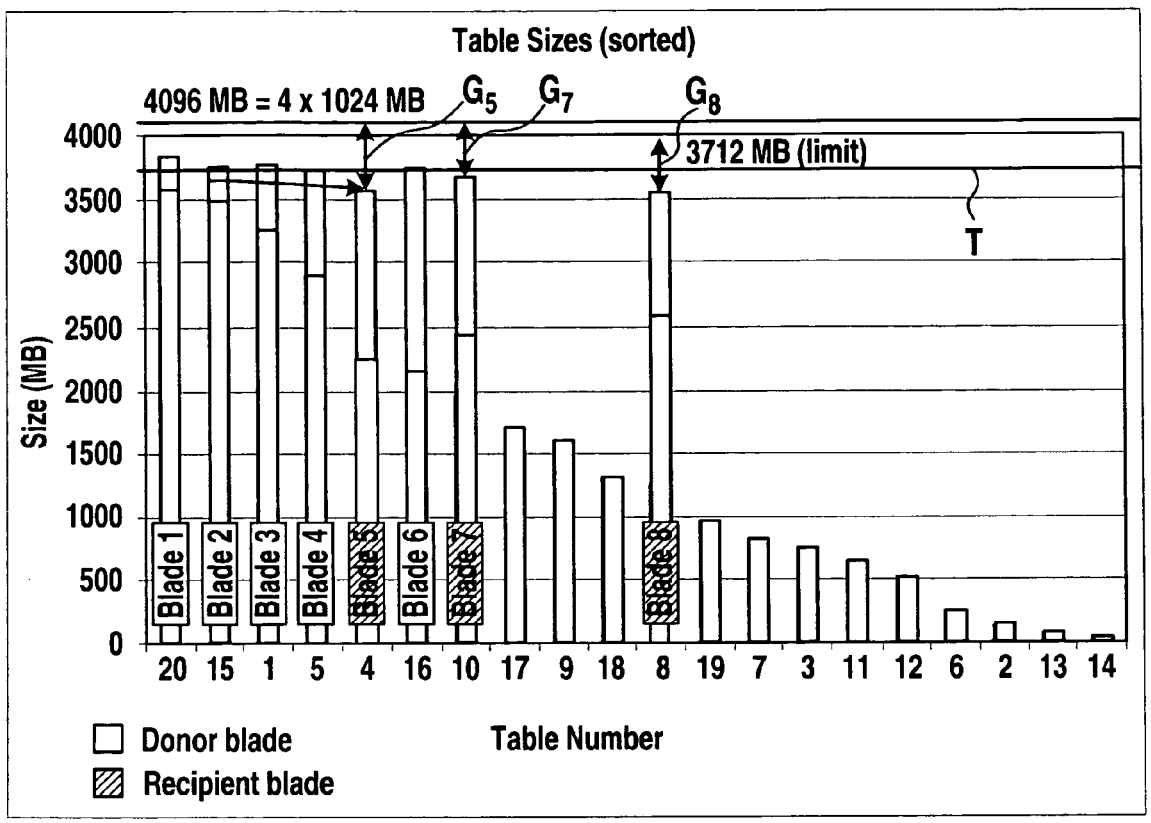
FIG. 23 is an exemplary illustration of multiple tentative reassignments of table 2 to blades 5, 7 and 8.

FIG. 23 illustrates, by way of example, the resulting actual distribution. In this distribution, blades 5, 7 and 8 are recipient blades. The next table in the ordered sequence is table 2 on donor blade 2. The competing tentative distributions obtained from the actual distribution of FIG. 23 are evaluated as follows:

| Tentative Distribution | New Standard Deviation |
| --- | --- |
| Table 2 to blade 5 | 71,50 MB |
| Table 2 to blade 7 | 103,36 MB |
| Table 2 to blade 8 | 77,26 MB |

The largest reduction of the standard deviation is thus obtained by moving table 2 to recipient blade 5. The corresponding tentative distribution is thus accepted. The resulting actual distribution is shown in FIG. 24.

Figure 24:
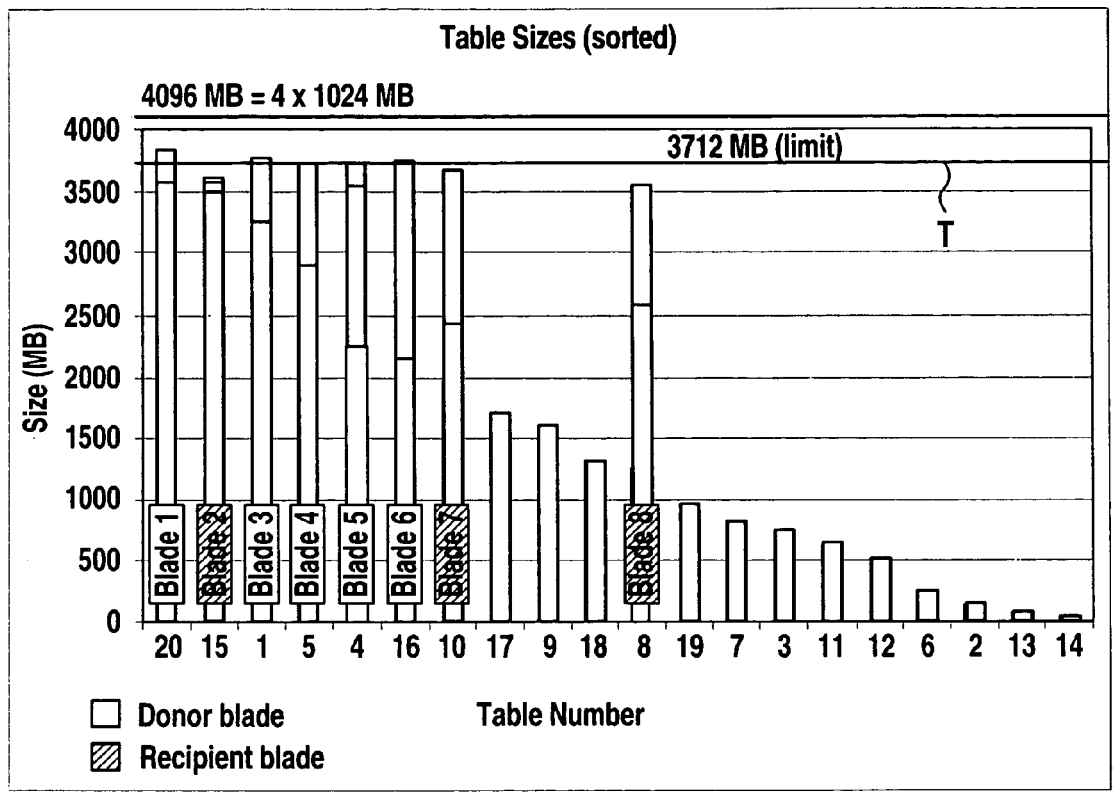
FIG. 24 shows, by way of example, the final redistribution of tables to blades.

In the actual distribution of FIG. 24m blades 2, 7 and 8 are recipient blades. The remaining tables in the ordered sequence, i.e. tables 13 and 14, are assigned to recipient blade 2 and can thus by definition not be reassigned. Hence, the actual distribution as shown in FIG. 24 is the final distribution obtained from the initial distribution of FIG. 11. It is to be noted that the smoothness of the final distribution is improved drastically as it is also indicated by the drop of the standard deviation from 741.06 MB to 71.50 MB.

Figure 25A:
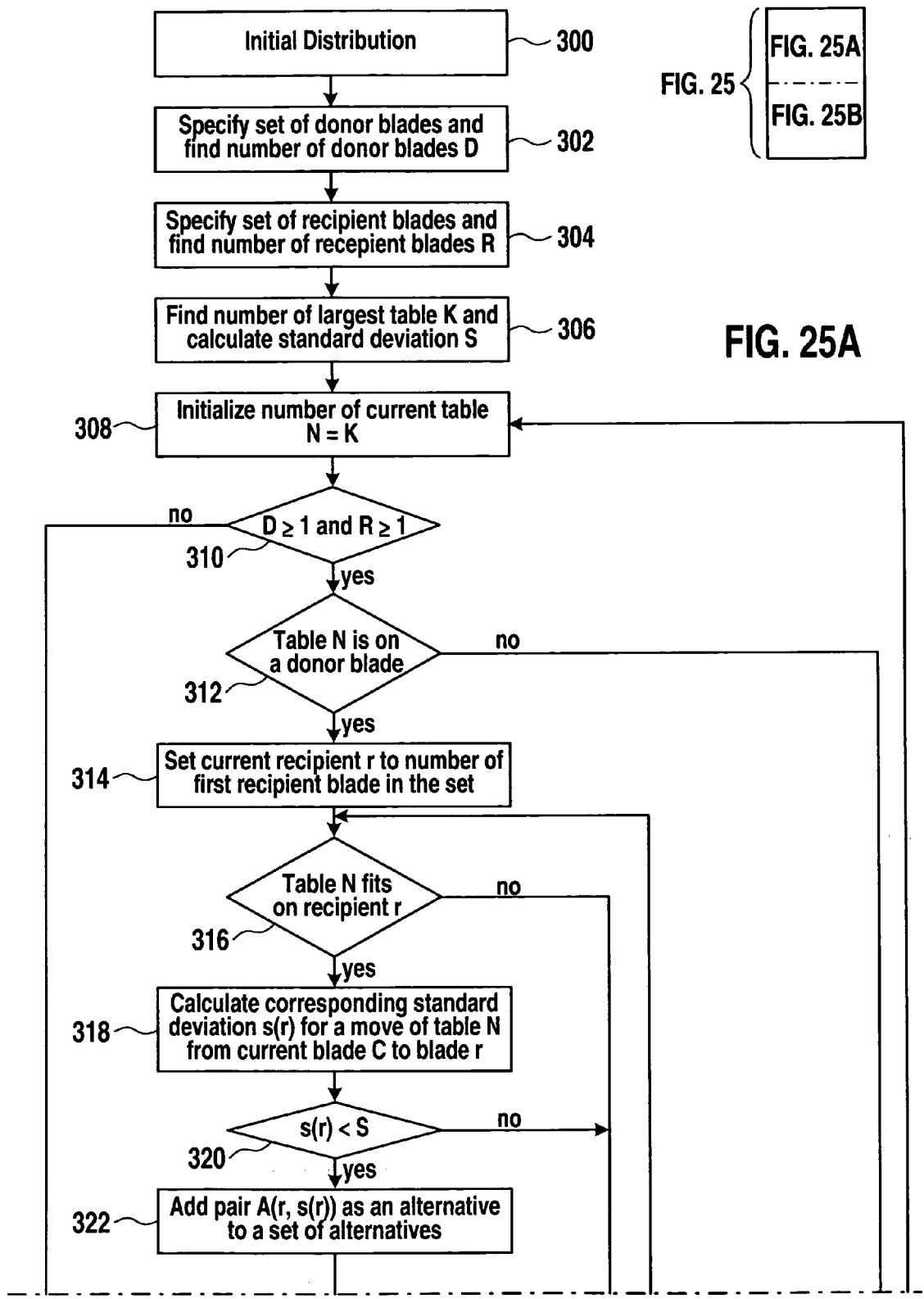
FIGS. 25A and 25B illustrate a flow diagram of another exemplary method, consistent with an embodiment of the invention.
Figure 25B:
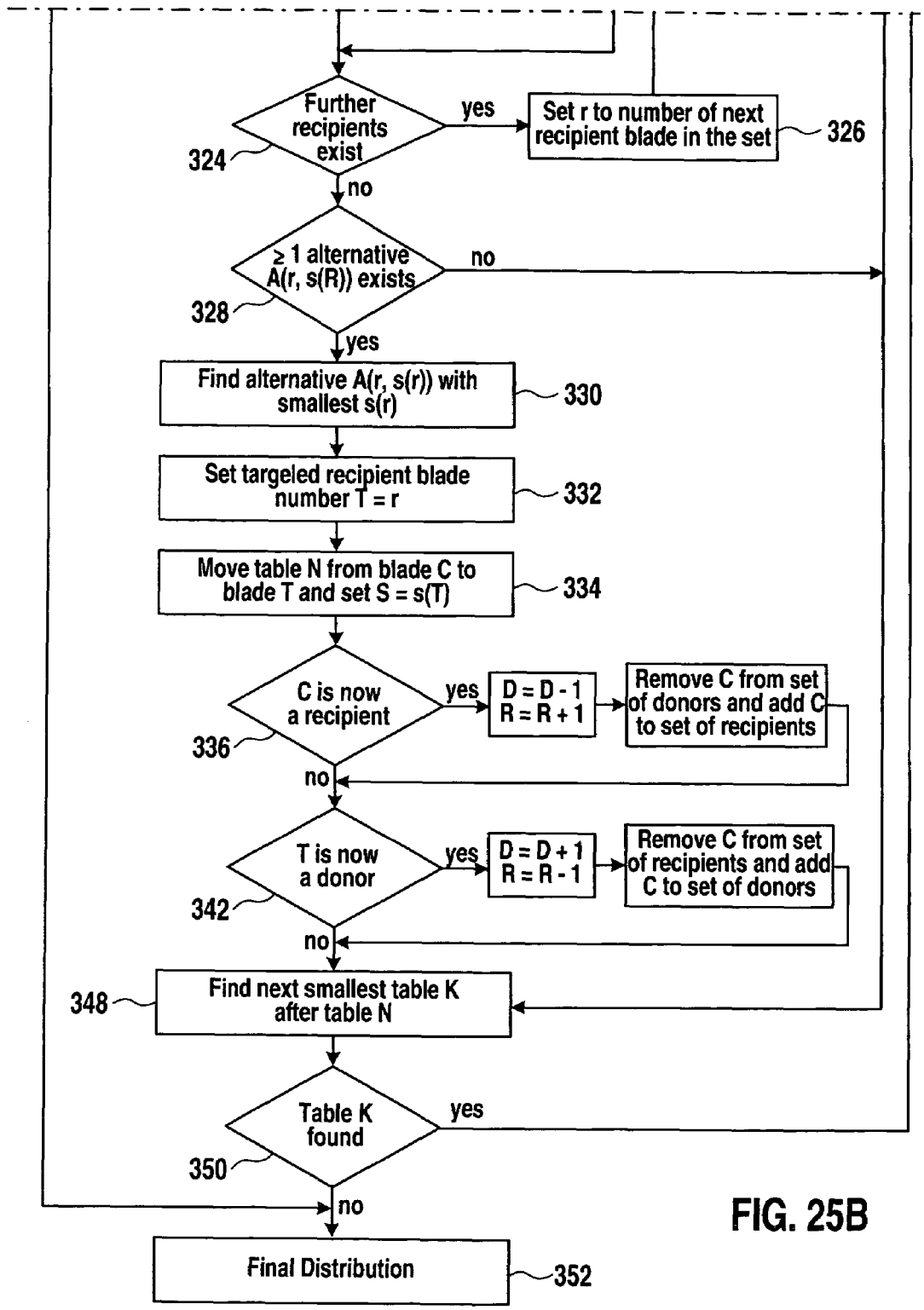

FIGS. 25A and 25B illustrate an exemplary method flow diagram, consistent with an embodiment of the invention. The exemplary method of FIGS. 25A and 25B may be implemented for redistributing objects.

In step 300, an initial distribution of tables to blades is provided. For example, this can be done by means of the method of FIG. 3. Alternatively, any other distribution can be used as a starting point, e.g. a real life distribution of an existing blade computing system. It is to be noted that it is not essential for embodiments of the present invention that the initial distribution has the minimum number of blades (as it can be provided by the method of FIG. 3).

In step 302, the set of donor blades in the initial distribution is determined. Preferably, this is done by means of a threshold level. For example, the threshold level is obtained by calculating the total of all table sizes and dividing the total of all table sizes by the total number of blades. Those blades that have tables having an aggregated size surpassing the threshold are by definition donor blades. The number of donor blades in the initial distribution is denoted D.

Likewise, the set of recipient blades in the initial distribution is determined. By definition, a blade that is not a donor blade is a recipient blade. The number of recipient blades may be denoted R.

In step 306, the largest table K in the initial distribution is identified. Further, the standard deviation S of the aggregated table sizes in the initial distribution is calculated in step 306. Thereafter, in step 308, the number N of the current table is initialized to K.

In step 310, a determination is made whether D>=1 and R>=1. If this is not the case, there is either no recipient or no donor blade such that none of the tables can be reassigned. In this instance, the initial distribution cannot be further improved.

If it is determined in step 310 that there is in fact at least one donor blade and at least one recipient blade, then the control goes to step 312. In step 312, a determination is made whether table N is on a donor blade. If this is not the case, the control goes to step 348. In step 348, the next smallest table K after table N is searched. In step 350, it is decided if such a smaller table K has been found. If this is not the case, the control stops in step 352. If the contrary is the case, then the control goes back to step 308.

If it has been determined in step 312 that table N is in fact on a donor blade, then the process goes on to step 314 where one of the recipient blades in the set of recipient blades is arbitrarily chosen as the current recipient r in order to investigate a corresponding tentative reassignment of table N.

In step 316, a determination is made whether table N fits on recipient r. If this is the case, the standard deviation s(r) of the resulting tentative distribution obtained by moving table N from its current blade C to blade r is calculated in step 318. In step 320, it is determined whether the standard deviation s(r) is below the standard deviation S of the actual distribution.

If this is the case, blade r becomes a candidate blade as a target for reassigning table N. As a result, blade r and the corresponding standard deviation s(r) may be stored in array A, in step 322. It is to be noted that instead of array A, any other suitable data structure can be used for storage of tuples r, s(r), such as a linear pointer list, a file, or another data structure. From step 322, the control goes to step 324 where a determination is made whether further recipient blades exist in the actual distribution that need to be processed. If this is the case, the control goes to step 326 where r is set to the number of the next recipient blade in the set of recipient blades that has not been processed so far. From step 326, the control goes back to step 316.

If it turned out in step 316 that table N does not fit on recipient r or if it turned out in step 320 that s(r) is not below S, the control goes directly from step 316 or step 320 to step 324.

After all recipients in the set of recipient blades have been processed the control goes to step 328. In case there is no pair r, s(r) in the array R the control goes directly from step 328 to step 348 in order to initiate the consecutive iteration, if any.

If there is at least one entry in array A the control goes from step 328 to step 330. In step 330, the entry of array A having the smallest s(r) is identified. In consecutive step 332, the target recipient blade T for moving of table N is set to r. In step 334, table N is moved from donor blade C to recipient blade T and S is set to s(T).

In step 336, a determination is made whether blade C has become a recipient blade due to the move. If this is the case, the numbers D and R are adapted correspondingly in step 338. Blade C is removed from the set of donor blades and added to the set of recipient blades in step 340 from where the control goes to step 342. In case blade C has not become a recipient blade, the control goes directly from step 336 to step 342.

In step 342, it is determined whether blade T has become a donor blade. If this is the case, the numbers D and R are adapted correspondingly in step 344 and blade C is removed from the set of recipient blades and added to the set of donor blades in step 346. From there the control goes to step 348. In case it is determined in step 342 that blade T has not become a donor blade, the control goes directly from step 342 to step 348.

The loop consisting of steps 308 to step 350 may be carried out until all tables have been processed in descending order. The final distribution which is thus obtained is output in step 352.

Figure 26:
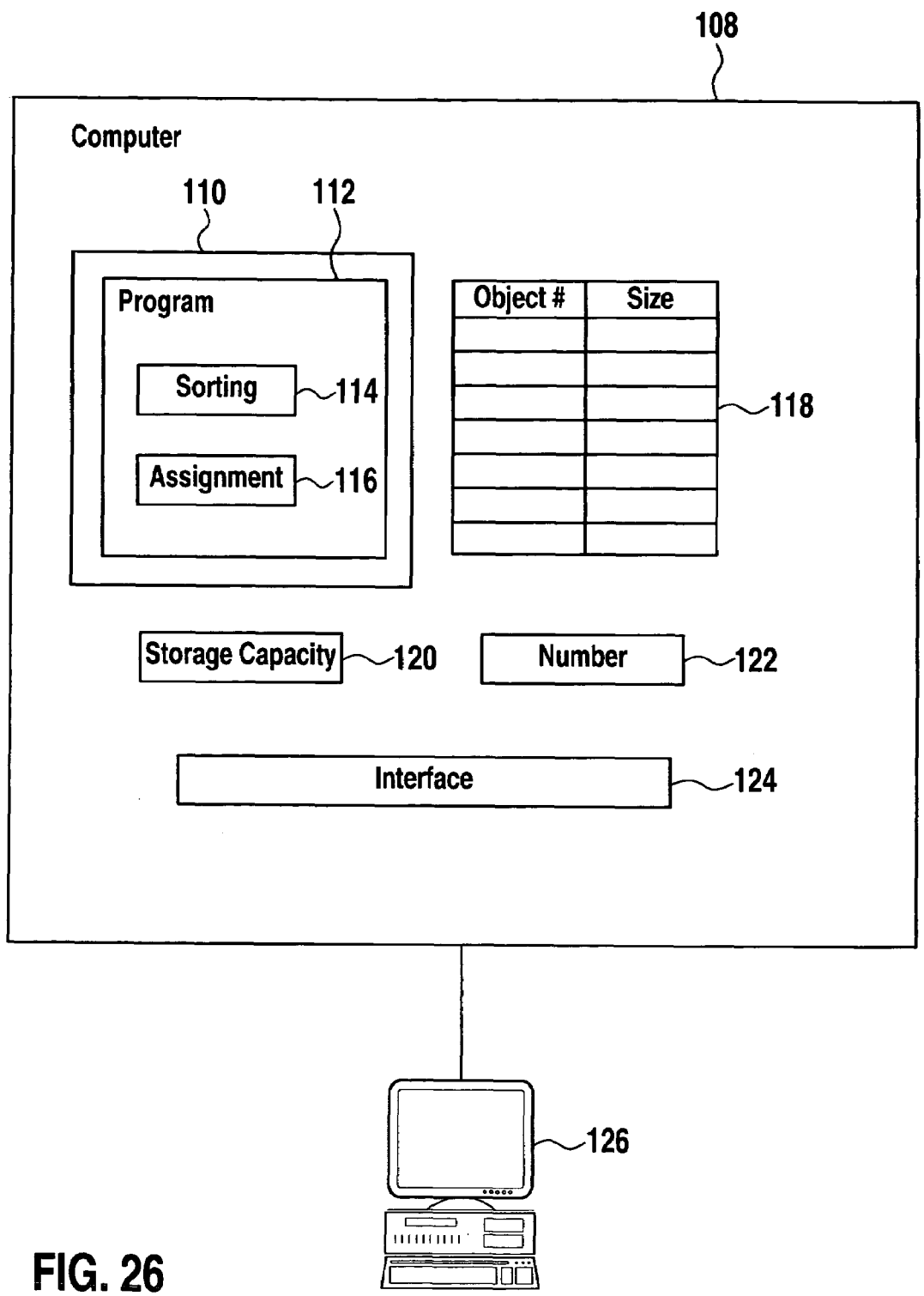
FIG. 26 illustrates an exemplary computer system for performing the assignment of objects to blades, consistent with an embodiment of the invention.

FIG. 26 illustrates a diagram of an exemplary computer 108, consistent with an embodiment of the invention. As shown in this embodiment, computer 108 may comprise a processor 110 for running a program 112. Program 112 may include a module 114 for sorting of objects by size and a module 116 for assigning of objects to blades.

Further, computer 108 may comprise storage 118 for storing a table listing the objects and object sizes to be assigned to blades, a storage 120 for storing a storage capacity value for the blades and a storage 122 for storing the number of blades. Computer 108 may also include an interface 124 for coupling to a workstation 126.

In operation, the table with the object names/numbers and object sizes is entered via interface 124 and stored in storage 118. This corresponds to the information shown in, for example, FIG. 4.

Further, a storage capacity value for the storage capacity of each individual blade may be entered via interface 124 and stored in storage 120. In the example considered here, the storage capacity value is 4 GB for all blades.

Next, program 112 is invoked. Program 112 may sort the table of storage 118 by size to provide a sequence of objects (cf. FIG. 5). Further, module 116 may perform the method of FIG. 3 in order to determine the minimum number of required blades. This minimum number is stored in storage 122 and is output via user interface 124. As disclosed herein, this number can be a basis for a user's investment decision for purchasing the number of blades to realize a data processing system being capable of handling the objects as listed in the table.

Next, module 116 may perform the method of FIG. 1 and/or FIG. 25 for refinement of the object size balancing.

Alternatively, computer 108 is one of the blades. In this instance, computer 108 can dynamically change the assignment of objects to blades when object sizes change. This way, frequent swapping operations for swapping objects between blades can be avoided.

Other embodiments of the invention will be apparent to those skilled in the art from consideration of the specification and practice of the embodiments of the invention disclosed herein. It is intended, therefore, that the specification and examples be considered as exemplary only, with a true scope and spirit of the invention being indicated by the following claims.

What is claimed is:

1. A computer-implemented method of assigning objects to processing units, the processing units having storage capacities, the method comprising the steps, performed by a processor, of:

providing an ordered sequence of the objects;

providing an initial assignment of the objects to the processing units, wherein the processing units have aggregated sizes equal to the numbers of objects assigned to the processing units; and processing the ordered sequence of objects, the processing comprising:

determining a first set of processing units comprising the processing units with an aggregated size above a threshold, determining a second set of processing units comprising the processing units with an aggregated size below the threshold, determining whether there exists, for objects initially assigned to processing units of the first set, processing units in the second set with storage capacities sufficient to store the objects;

when it is determined there exists exactly one processing unit in the second set with a storage capacity sufficient to store an object initially assigned to a processing unit of the first set:

tentatively reassigning the object to the determined processing unit in the second set, calculating a first statistical measure for the tentative reassignment of the object to the determined processing unit in the second set, and permanently reassigning the object to the determined processing unit in the second set when the first statistical measure indicates an improvement in smoothness of the tentative reassignment; and when it is determined there exists more than one processing unit in the second set with a storage capacity sufficient to store the object:

determining a plurality of tentative reassignments by tentatively reassigning the object to the processing units in the second set with storage capacities sufficient to store the object, calculating second statistical measures for the plurality of tentative reassignments, and permanently reassigning the object to a processing unit of the second set corresponding to the tentative reassignment having the second statistical measure indicating the largest improvement in smoothness.

2. The computer-implemented method of claim 1, wherein the ordered sequence is sorted by object size.

3. The computer-implemented method of claim 1, wherein the initial assignment of the objects to the processing units is provided by performing the following steps:

assigning the objects to the processing units, starting with the largest object in the sequence, until a storage capacity of any remaining processing units is less than a storage capacity required to store the smallest object of the sequence; and deleting the objects assigned to processing units from the sequence.

4. The computer-implemented method of claim 1, wherein the threshold is the aggregated size of the objects divided by the number of processing units.

5. The computer-implemented method of claim 1, wherein the statistical measure is calculated on the basis of the aggregated sizes of the objects assigned to processing units.

6. The computer-implemented method of claim 5, wherein the statistical measure is the variance or standard deviation of the aggregated sizes of the objects assigned to processing units.

7. A computer-readable storage medium storing a computer program comprising instructions that, when executed by a processor, cause the processor to perform a method for assigning objects to a plurality of processing units, the method comprising the steps of:

providing an ordered sequence of objects;

providing an initial assignment of the objects to the processing units, wherein the processing units have aggregated sizes equal to the numbers of objects assigned to the processing units;

determining a first set of processing units comprising the processing units having an aggregated size above a threshold;

determining a second set of processing units comprising the processing units having an aggregated size below the threshold;

determining whether there exists, for objects initially assigned to processing units of the first set, processing units of the second set with sufficient storage capacities to store the objects;

when it is determined there exists exactly one processing unit in the second set with a storage capacity sufficient to store an object initially assigned to a processing unit of the first set:

tentatively reassigning the object to the determined processing unit of the second set, calculating a first statistical measure for the tentative reassignment of the object to the determined processing unit of the second set, and permanently reassigning the object to the determined processing unit of the second set when the first statistical measure indicates an improvement in smoothness of the tentative reassignment; and when it is determined that there exists more than one processing unit of the second set having sufficient storage capacity to store the object:

determining a plurality of tentative reassignments by tentatively reassigning the object to the processing units of the second set with storage capacities sufficient to store the object, calculating second statistical measures for the plurality of tentative reassignments, and permanently reassigning the object to a processing unit of the second set corresponding to the tentative reassignment having the second statistical measure indicating the largest improvement in smoothness.

8. A data processing system for assigning objects to processing units, the processing units having a storage capacity, the data processing system comprising:

means for storing an ordered sequence of objects;

means for providing an initial assignment of the objects to the processing units, wherein the processing units have aggregated sizes equal to the numbers of objects assigned to the processing units; and means for processing the ordered sequence of objects, the means for processing comprising:

means for determining a first set of processing units comprising the processing units with an aggregated size above a threshold, means for determining a second set of processing units comprising the processing units with an aggregated size below the threshold, means for determining whether there exists, for objects initially assigned to processing units of the first set, processing units in the second set with storage capacities sufficient to store the objects;

means for, when it is determined there exists exactly one processing unit in the second set with a storage capacity sufficient to store an object initially assigned to a processing unit in the first set:

tentatively reassigning the object to the determined processing unit in the second set, calculating a first statistical measure for the tentative reassignment of the object to the determined processing unit in the second set, and permanently reassigning the assigned object to the determined processing unit in the second set when the first statistical measure indicates an improvement in smoothness of the tentative reassignment; and means for, when it is determined there exists more than one processing unit in the second set with a storage capacity sufficient to store the object:

determining a plurality of tentative reassignments by tentatively reassigning the object to the processing units in the second set with storage capacities sufficient to store the object, calculating second statistical measures for the plurality of tentative reassignments, and permanently reassigning the object to a processing unit of the second set corresponding to the tentative reassignment having the second statistical measure indicating the largest improvement in smoothness.

9. The data processing system of claim 8 wherein the means for providing an initial assignment of the objects further comprises:

means for assigning the objects to the processing units, starting with the largest object in the sequence, until a storage capacity of any remaining processing units is less than a storage capacity required to store the smallest object of the sequence; and means for deleting the objects assigned to a processing units from the sequence.

10. A server hardware system including an ordered sequence of objects and an initial assignment of the objects to the servers, the hardware system comprising a processor adapted to reassign an object by:

determining aggregated sizes for servers in the server hardware system, the aggregated size being the number of objects assigned to the servers;

determining a first set of the servers comprising the servers with an aggregated size above a threshold, determining a second set of the servers comprising the servers with an aggregated size below the threshold, assigning the objects in the order of the sequence to the first set of servers and to the second set of servers, the assigning comprising:

determining whether there exists, for objects initially assigned to servers of the first set, servers in the second set with storage capacities sufficient to store the objects, when it is determined there exists exactly one server in the second set with a storage capacity sufficient to store an object initially assigned to a server of the first set:

tentatively reassigning the object to the determined server in the second set, calculating a first statistical measure for the tentative reassignment of the object to the determined server in the second set, and permanently reassigning the object to the determined server of the second set when the first statistical measure indicates an improved smoothness of the tentative reassignment, and when it is determined there exists more than one server in the second set with a storage capacity sufficient to store the object:

determining a plurality of tentative reassignments by tentatively reassigning the object to the servers in the second set with storage capacities sufficient to store the object, calculating second statistical measures for the plurality of tentative reassignments, and permanently reassigning the object to a server of the second set corresponding to the tentative reassignment having the second statistical measure indicating the largest improvement in smoothness.

\* \* \* \* \*

UNITED STATES PATENT AND TRADEMARK OFFICE
CERTIFICATE OF CORRECTION

| | | |
|---|---|---|
| PATENT NO. | : 7,647,592 B2 | Page 1 of 1 |
| APPLICATION NO. | : 10/964607 | |
| DATED | : January 12, 2010 | |
| INVENTOR(S) | : Volker Sauermann | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1466 days.

Signed and Sealed this

Sixteenth Day of November, 2010

David J. Kappos
*Director of the United States Patent and Trademark Office*